United States Patent
Kozlowski et al.

(10) Patent No.: US 11,116,362 B2
(45) Date of Patent: Sep. 14, 2021

(54) BLENDING VOLUME REDUCING DEVICE

(71) Applicant: Vita-Mix Management Corporation, Olmsted Township, OH (US)

(72) Inventors: Eugene J. Kozlowski, Medina, OH (US); Mark F. Fleming, Strongsville, OH (US); David J. Kolar, Stow, OH (US); Stephen Hosey, North Olmsted, OH (US); Fred H. Mehlman, Brunswick, OH (US); Jonathan Emerson, Olmsted Township, OH (US); Brian Harvanec, Olmsted Township, OH (US); Richard D. Boozer, Wakeman, OH (US); Stephen P. Rukavina, Rocky River, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 170 days.

(21) Appl. No.: 16/442,766

(22) Filed: Jun. 17, 2019

(65) Prior Publication Data

US 2019/0298109 A1    Oct. 3, 2019

Related U.S. Application Data

(63) Continuation of application No. 14/826,975, filed on Aug. 14, 2015, now Pat. No. 10,321,785.

(60) Provisional application No. 62/038,041, filed on Aug. 15, 2014, provisional application No. 62/083,659, (Continued)

(51) Int. Cl.
*A47J 43/00* (2006.01)
*A47J 43/046* (2006.01)
*A47J 43/07* (2006.01)

(52) U.S. Cl.
CPC ......... *A47J 43/046* (2013.01); *A47J 43/0727* (2013.01)

(58) Field of Classification Search
CPC .......................... A47J 43/046; A47J 43/0727
See application file for complete search history.

(56) References Cited

U.S. PATENT DOCUMENTS

| 2,459,498 | A | 1/1949 | Cameron |
| 2,955,186 | A | 10/1960 | Ritter |
| 3,299,226 | A | 1/1967 | Edwards |

(Continued)

FOREIGN PATENT DOCUMENTS

| CN | 101194807 | 6/2008 |
| CN | 201324166 | 10/2009 |

(Continued)

OTHER PUBLICATIONS

Copenheaver, Blaine, International Search Report and Written Opinion, PCT/US2014/029134, dated Aug. 1, 2014, International Search Authority/USA.

(Continued)

*Primary Examiner* — Anshu Bhatia
(74) *Attorney, Agent, or Firm* — McDonald Hopkins LLC

(57) ABSTRACT

A blending system is disclosed herein. The blending system may comprise a blender base, a container and a blending volume reduction device. The blending volume reduction device may be removably inserted into the container of the blender system at various positions. The positions may alter the working volume of the container when the blending volume reduction device is inserted in the container.

17 Claims, 16 Drawing Sheets

Related U.S. Application Data filed on Nov. 24, 2014, provisional application No. 62/175,773, filed on Jun. 15, 2015.

(56) References Cited

U.S. PATENT DOCUMENTS

| | | | |
|---|---|---|---|
| 3,343,817 A * | 9/1967 | Carangelo | B01F 15/00 366/314 |
| 3,548,280 A | 12/1970 | Cockroft | |
| 3,731,059 A | 5/1973 | Wilson | |
| 3,943,421 A | 3/1976 | Shibata et al. | |
| 3,951,351 A | 4/1976 | Ernster et al. | |
| 4,568,193 A | 2/1986 | Contri et al. | |
| 4,686,356 A | 8/1987 | Ueda et al. | |
| 4,762,057 A | 8/1988 | Hirota et al. | |
| 4,822,172 A | 4/1989 | Stottmann | |
| 4,893,942 A | 1/1990 | Stottmann | |
| 4,968,864 A | 11/1990 | Doi et al. | |
| 5,156,867 A | 10/1992 | Leuthold et al. | |
| 5,267,211 A | 11/1993 | Kobayashi et al. | |
| 5,267,790 A | 12/1993 | Sutherland et al. | |
| 5,316,382 A | 5/1994 | Penaranda et al. | |
| 5,347,205 A | 9/1994 | Piland | |
| 5,363,746 A | 11/1994 | Gordon | |
| 5,392,695 A | 2/1995 | Junkel | |
| 5,531,153 A | 7/1996 | Maruyama et al. | |
| 5,556,198 A | 9/1996 | Dickson, Jr. et al. | |
| 5,562,020 A | 10/1996 | Shigeshiro | |
| 5,577,735 A | 11/1996 | Reed et al. | |
| 5,605,090 A | 2/1997 | Mantani et al. | |
| 5,635,233 A | 6/1997 | Levinson | |
| 5,660,467 A | 8/1997 | Mineo et al. | |
| 5,662,032 A | 9/1997 | Sands | |
| 5,768,978 A | 6/1998 | Dorner et al. | |
| 5,829,341 A | 11/1998 | Lin | |
| 5,839,356 A | 11/1998 | Dornbush et al. | |
| 5,967,021 A | 10/1999 | Yung | |
| 6,210,033 B1 | 4/2001 | Karkos, Jr. et al. | |
| 6,364,522 B2 | 4/2002 | Kolar et al. | |
| 6,402,365 B1 | 6/2002 | Wong | |
| 6,467,948 B1 | 10/2002 | Lawson | |
| 6,609,821 B2 | 8/2003 | Wulf et al. | |
| 6,676,051 B2 | 1/2004 | Rebordosa | |
| 6,959,562 B2 | 11/2005 | Navedo et al. | |
| 7,422,362 B2 | 9/2008 | Sands | |
| 7,430,957 B2 | 10/2008 | Sands | |
| 7,681,815 B2 | 3/2010 | Obersteiner | |
| 2002/0009017 A1 | 1/2002 | Kolar et al. | |
| 2002/0176320 A1 | 11/2002 | Wulf et al. | |
| 2004/0203387 A1 | 10/2004 | Grannan | |
| 2005/0068846 A1 | 3/2005 | Wulf | |
| 2005/0229795 A1 | 10/2005 | Stuckey | |
| 2006/0018189 A1 | 1/2006 | Chang Chien | |
| 2006/0086843 A1 | 4/2006 | Lin et al. | |
| 2006/0169715 A1 | 8/2006 | Emmendorfer et al. | |
| 2006/0203610 A1 | 9/2006 | Bohannon, Jr. et al. | |
| 2006/0214765 A1 | 9/2006 | Pitchers et al. | |
| 2007/0221668 A1 | 9/2007 | Baarman et al. | |
| 2008/0257168 A1 * | 10/2008 | Wolfe | A47J 27/002 99/348 |
| 2010/0224078 A1 | 9/2010 | Khalifa | |
| 2011/0189358 A1 | 8/2011 | Herbert | |
| 2011/0199852 A1 | 8/2011 | Martin | |
| 2011/0248108 A1 | 10/2011 | Carriere | |
| 2012/0206995 A1 | 8/2012 | Wu | |
| 2014/0286120 A1 | 9/2014 | Kolar | |
| 2015/0272394 A1 | 10/2015 | Lin et al. | |

FOREIGN PATENT DOCUMENTS

| | | |
|---|---|---|
| CN | 203749144 U | 8/2014 |
| EP | 2340753 | 7/2011 |
| FR | 2678502 | 1/1993 |
| JP | 04210558 | 7/1992 |
| WO | 200213622 | 2/2002 |
| WO | 2006104651 | 10/2006 |
| WO | 2006124051 | 11/2006 |

OTHER PUBLICATIONS

Young, Lee W., International Search Report and Written Opinion, PCT/US2014/029384, dated Aug. 11, 2014, International Search Authority/USA.

Gaggia Espanola, S.A., ipanerma, brochure, undated.

Gaggia Espanola, S.A., Copacabana, brochure, undated.

Gaggia Espanola, S.A., ipanema Space-Saving High Technology, brochure, undated.

Thomas, Shane, International Search Report and Written Opinion, ISA/US, PCT/US15/45361, dated Nov. 19, 2015, Alexandria, Virginia USA.

Supplementary Partial European Search Report for Application No. 15831925.1 related to PCT/US2015045361 dated Nov. 14, 2018.

European Search Report for EP 10178076 dated May 31, 2011 (3 pages).

International Search Report for PCT/EP01/08503 dated Feb. 13, 2002.

Office Action and Search Report issued by the State Intellectual Property Office of Peoples Republic of China in connection with Application No. 201580055430.6, dated May 31, 2019, 14 pages.

* cited by examiner

BLENDING VOLUME REDUCING DEVICE

CROSS-REFERENCE TO RELATED APPLICATION

This application is a continuation of U.S. Utility application Ser. No. 14/826,975 (filed on Aug. 14, 2015 and entitled "BLENDING CONTAINER VOLUME REDUCING DEVICE") which claims the benefit of U.S. Provisional Patent Application Ser. No. 62/038,041 (filed Aug. 15, 2014, and entitled "BLENDING CONTAINER VOLUME REDUCING DEVICE"), U.S. Provisional Patent Application Ser. No. 62/083,659 (filed Nov. 24, 2014, and entitled "BLENDING CONTAINER VOLUME REDUCING DEVICE"), and U.S. Provisional Patent Application Ser. No. 62/175,773 (filed Jun. 15, 2015, and entitled "BLENDING SYSTEM"), the entireties of which are incorporated herein by reference.

FIELD

This technology relates to blending enhancement tools, and more specifically, to a blending volume reducing device for a blender assembly.

BACKGROUND

Blenders are used to prepare food items by performing a blending operation on food stuff. A blender can include a container for receiving food and a blade assembly that is rotatable to blend the food received within the container. The blending container can comprise a working volume that is defined by the volume of space within the container that is generally exposed to the blade assembly. In other words, the working volume is the volume of space within the container where food may be received and blended.

Sometimes, food items such as spices are placed in the container of a blender in order to be ground and incorporated into the other blended food. However, the working volume of the container is often larger than is optimal for the food item to be ground. For example, if not confined to a smaller volume, whole spices like peppercorns, cloves, etc., may bounce around the container during the grinding operation or coat the walls of the container. The spices will not be focused by the blades and extra spices may need to be added to get a preferred grind and yield.

Similarly, other foodstuff may be placed in the container of a blender in order to be blended. However, the working volume of the container is often larger than is optimal for foodstuffs to be blended. For example, if not confined to a smaller volume, it may take longer than is desirable to blend a smoothie or any other kind of foodstuffs.

Further, in moderate to high liquid ratio blending recipes, the efficiency of breaking down ingredients and/or increasing temperature rise may be slowed due to ingredients jumping and splashing around a large blending area. Therefore, there is a need to reduce the blending volume to decrease the time to heat the ingredients or otherwise just blend them.

SUMMARY

The following presents a simplified summary of the disclosure in order to provide a basic understanding of some example aspects described in the detailed description.

A blending system may comprise a container comprising a cavity, a blade assembly comprising a blade, the blade disposed within the cavity, and a blending volume reduction device operatively insertable within the cavity to alter a working volume of the container. The working volume may be defined by the volume of space within the cavity that is exposed to the blade. In an aspect, the blending volume reduction device may comprise a cover member configured to contact at least a portion of an inner wall of the container. In another aspect, the cover member comprises at least one aperture. The blending system may comprise a plug member configured to selectively cover the at least one aperture.

According to an aspect, a blending volume reduction device may comprise a handle. The handle may be removably attached to the blending volume reduction device. In another aspect, the handle may comprise a handle cover portion that may selectively cover at least a portion of an aperture of the blending volume reduction device. The handle may comprise a length. The length of the handle may be adjustable. In another aspect, the handle may comprise an engagement member configured to engage with an engagement member of a container. The blending volume reduction device may be held in a position when the engagement member of the handle engages with the engagement member of the container. A blending system may comprise a lever member comprising a handle that is operatively, hingedly attached to the container, wherein the lever may be configured to transfer force to the handle to alter a position of the blending volume reduction device.

In an aspect, the perimeter of the blending volume reduction device may mechanically nest with an intermediate perimeter of the container. For instance, the blending volume reduction device may be friction fit with the container. The blending volume reduction device may comprise a seal member disposed about at least a portion of the perimeter of the blending volume reduction device. In an aspect, the seal may allow a threshold amount of air to pass therethrough and may generally prevent spillage of foodstuff.

A blender is described herein. The blender may comprise a base, a container, the container and a blending volume reduction device that may be inserted within the container, the blending volume reduction device may comprise a cover member having a perimeter. The base may comprise a motor. The container may comprise a closed end with a side wall extending upwardly from said closed end and terminating at an open end. In an aspect, the perimeter of the blending volume reduction device is configured to contact the side wall, and wherein the blending volume reduction device is positionable between the closed end and the open end. In another aspect, portions of the side wall may be generally parallel therewith and/or may comprise zero-slant walls. The perimeter of the blending volume reduction device may be similar in shape to an inner perimeter of the side wall of the container. For instance, the container may comprise at least one rib protruding from the side wall. The perimeter of the blending volume reduction device may comprise a recessed portion or a slot that may mate with the at least one rib.

The blender may comprise a stop that may prevent the blending volume reduction device from contacting a blade assembly. For instance, the container may comprise at least one protrusion extending from the side wall, the protrusion may prevent the blending volume reduction device from being inserted past a determined length. In another aspect, the blending volume reduction device may comprise at least one shield member extending from the cover member, wherein when the blending volume reduction device may be inserted into the container, the shield member extends from the cover member towards the side wall. The shield member may comprise a curved surface that faces an axis of the container when the blending volume reduction device is inserted in the container.

A blending volume reduction device for use with a blending container is described herein. The blending volume reduction device may comprise, a cover member comprising a main body, at least one side wall extending generally perpendicular from a perimeter of the main body, and a seal member extending from the at least one side walls, wherein the seal member is configured to form a seal with the container when the blending volume reduction device is inserted in the blending container. In another aspect, the blending volume reduction device may comprise a handle.

BRIEF DESCRIPTION OF THE DRAWING FIGURES

These and other features, aspects and advantages of the present disclosure are better understood when the following detailed description is read with reference to the accompanying drawings, in which.

DETAILED DESCRIPTION

Figure 1:
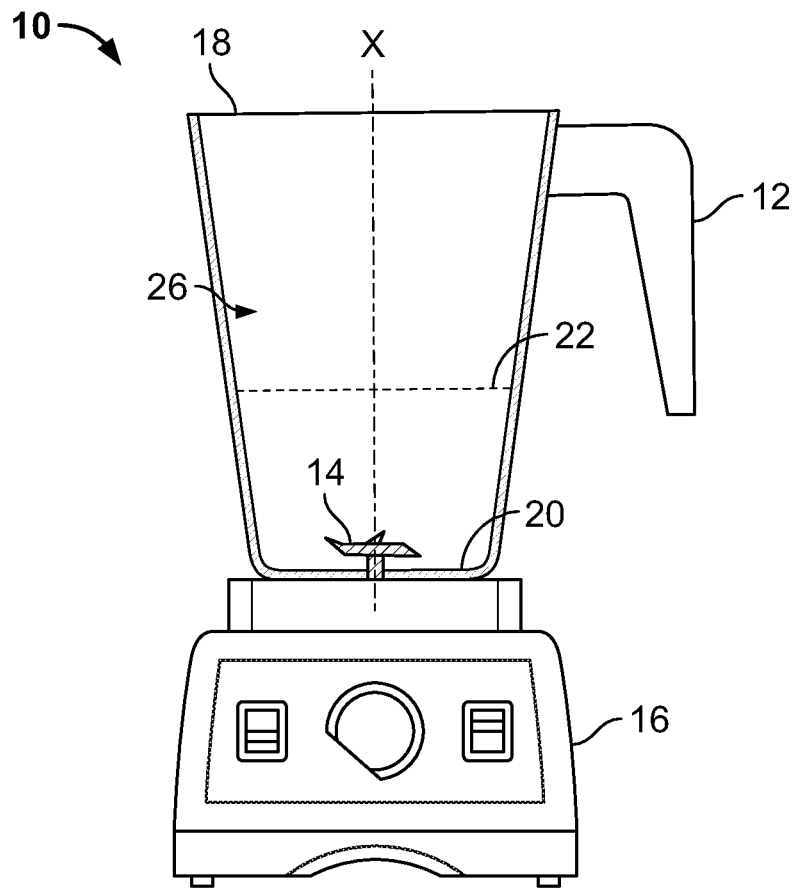
FIG. 1 is a partial cross-sectional view of a blender assembly, in accordance with various disclosed aspects.

Examples will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a controller, a display, a memory and a processor. Further, such systems may include a container and a rotating assembly, e.g., a blade assembly, which may be configured to manipulate, mix, agitate, or otherwise blend a product. The blade assembly, the container, and the blender base may removably or irremovably attach. The container may be powered in any appropriate manner, such as disclosed in U.S. patent application Ser. No. 14/213,557, entitled Powered Blending Container, which is hereby incorporated by reference.

Foodstuff may be added to the blending container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blender systems may include any household blender and/or any type of commercial blender system, including those with covers that may encapsulate or partially encapsulate the blender. Further, commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In an embodiment, the blender assembly may include a blending container and a blade assembly. The blending container may comprise a pitcher, bowl, cup, or other general shape. It is noted that the blending container may be configured for single serving use, commercial use, multi-serving use, or the like. The blending container may include or be coupled with (e.g., removably or irremovably) a blade assembly. The blade assembly may include one or more blades having one or more wings.

Embodiments describe a blender assembly or system. In an aspect the blender assembly may comprise a blending volume reduction device as disclosed herein. It is noted that the blending volume reduction device may comprise various materials. For instance, a blending volume reduction device may comprise materials, such as food grade plastics, metals, rubbers, and the like, such as polyesters, copolyester (e.g., TRITAN), or the like. It is further noted that embodiments may include metal, wood, glass, or other materials.

Figure 2:
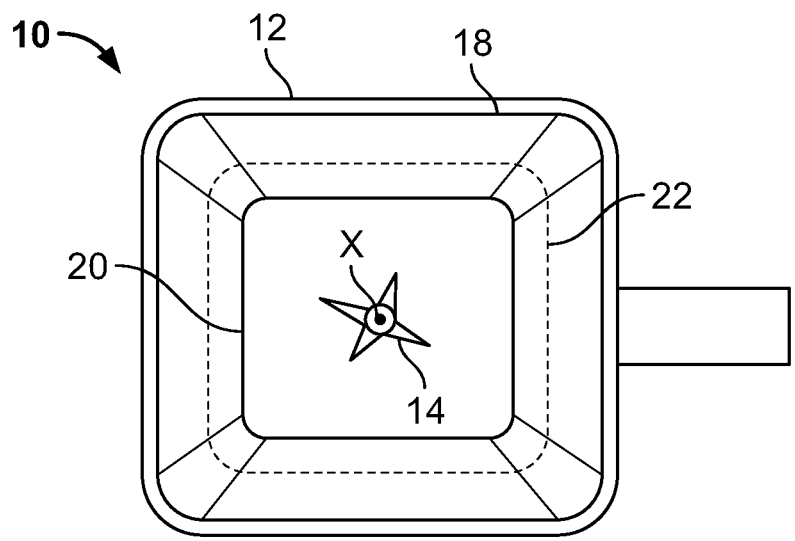
FIG. 2 is a top view of the blender assembly of FIG. 1, in accordance with various disclosed aspects.

With reference now to the accompanying drawings, a blender assembly 10 is illustrated in FIGS. 1 and 2 that comprises a container 12 for receiving food for blending, a blade assembly 14 for blending the contents (e.g., foodstuff) received within the container 12, and a blender base 16. The container 12 may comprise an axis X, a top inner perimeter 18, a bottom inner perimeter 20, and an intermediate inner perimeter 22 located generally between top inner perimeter 18 and the bottom inner perimeter 20. The top, bottom, and intermediate inner perimeters 18, 20, 22 all generally circumscribe the axis X of the container 12. As shown in the present example, an internal, radial cross-sectional area of the container 12 can become smaller along the axis X of the container 12 from the top to the bottom of the container 12. However, in other embodiments, the internal, radial cross-sectional area of the container 12 can be constant along the axis X; or the internal, radial cross-sectional area may become generally smaller along the axis X of the container 12 from the open end (e.g., top) to the closed end (e.g., bottom) of the container 12. The container 12 further comprises a working volume 26 that is defined by the volume of space within the container 12 that is exposed to the blade assembly 14 or otherwise may comprise contents to be blended by the blade assembly 14. In other words, the working volume 26 is the volume of space that food may be received within the container 12 for blending.

Figure 3:
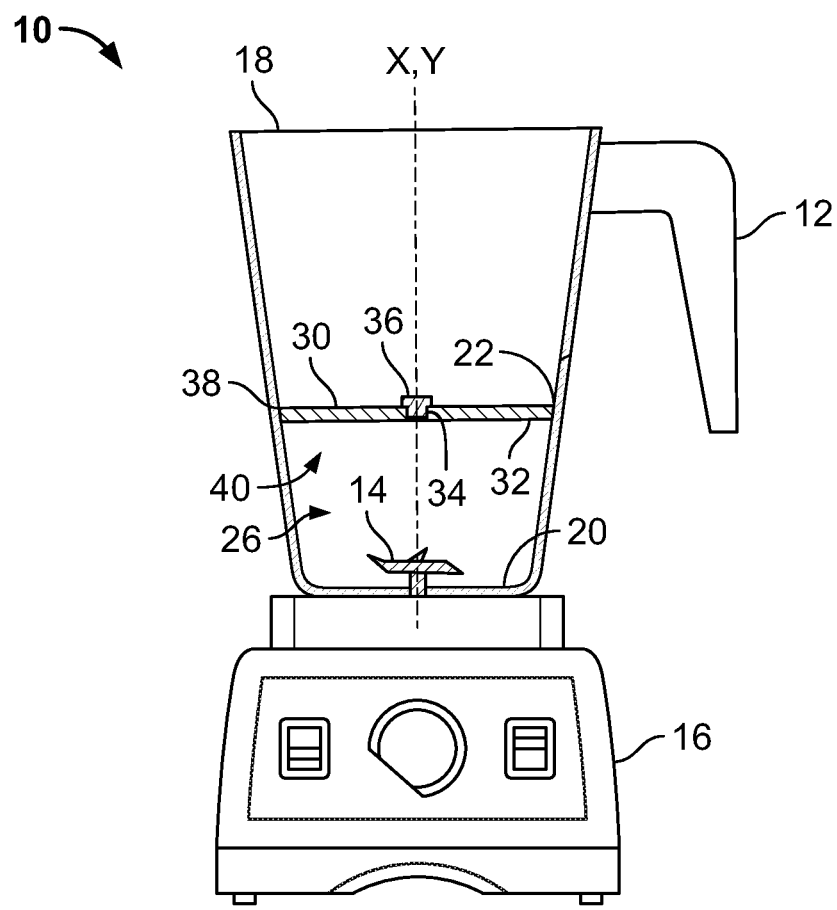
FIG. 3 is a partial cross-sectional view of the blender assembly of FIG. 1, comprising a blending volume reduction device, in accordance with various disclosed aspects.
Figure 4:
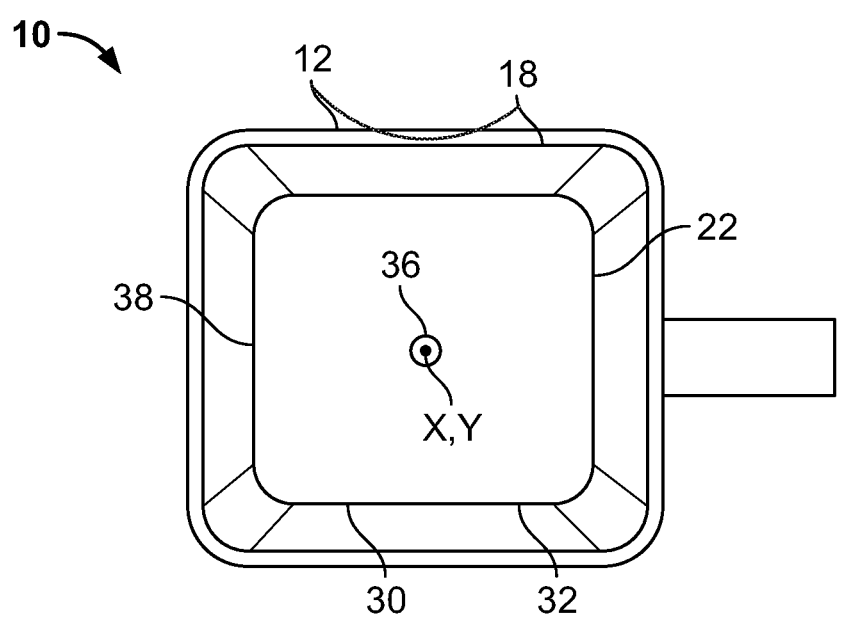
FIG. 4 is a top view of the blender assembly of FIG. 1 comprising the blending volume reduction device, in accordance with various disclosed aspects.

The blender assembly 10 can further comprise a blending volume reduction device 30, as shown in FIGS. 3 and 4. The blending volume reduction device 30 comprises a cover member 32 that can comprise an aperture 34 extending therethrough and a plug member 36 removably inserted in the aperture 34. The blending volume reduction device 30 is configured to be removably inserted into the container 12. The blending volume reduction device 30 is further configured such that when the blending volume reduction device 30 is positioned in the container 12, the blending volume reduction device 30 reduces the working volume 26 of the container 12. In an aspect, the working volume 26 may be cut off generally horizontally, with respect to the axis X. In an aspect, a non-working volume 27 may be divided from the working volume 26, and may be defined by a volume between (e.g., above) blending volume reduction device 30 and a lid (not shown) or an open end of the container 12.

More specifically, the blending volume reduction device 30 comprises an axis Y and the cover member 32 can comprise an outer perimeter 38 that circumscribes the axis Y and generally matches the intermediate inner perimeter 22 of the container 12. Because the internal, radial cross-sectional area of the container 12 may become smaller along the axis X of the container 12 from the top to the bottom of the container 12, when the blending volume reduction device 30 is inserted into the container 12 such that the axes X' and Y of the container 12 and blending volume reduction device 30 are substantially coaxial, the cover member 32 will rest at the intermediate inner perimeter 22 of the container 12 and be supported by the side walls of the container 12. It is noted that the inner perimeter 22 may be a desired distance below the opened end and/or above the closed end of blade assembly 14. For example, the inner perimeter 22 may be a distance selected to reduce the working volume 26 by about or more than 75% of an original volume (e.g., volume with a lid). In an aspect, the cover member 32 may press radially outwards to contact the container 12, such as through a friction fit or mechanical nesting. For instance, the blending volume reduction device 30 may comprise elastic, anelastic, viscoelastic, or other material that may be deformed to create a tight fitting seal. In another aspect, the material may comprise rubbers, foams, plastics, or the like. It is noted that the "seal" may be an airtight seal, water or liquid-tight seal, or the like.

In at least one embodiment, the cover member 32 may be additionally or alternatively supported by other means such as, for example, hooks that are secured to top edges of the container's side walls, a handle, and/or a cover of the container 12. In another example, the cover member 32 may be additionally or alternatively supported by legs that may be supported by the container 12 bottom. According to at least one embodiment, the cover member 32 may be additionally or alternatively supported by formations of the container 12, such as a stop or protrusion extending proximal to the intermediate inner perimeter 22. As can be seen in FIG. 3, the cover member 32 will bound a top portion 40 of the working volume 26, thus reducing its size. In another aspect, the container 12 may include one or more ridges, such as a plurality of ridges, and/or one or more ledges on which the cover member 32 may rest or operatively engage. A ridge or ledge may be disposed at a position to result in a predetermined volume of a blended product and/or amount of ingredients to be blended. For example, certain settings (e.g., commercial settings, dietary regiments, etc.) may require repeatability of a blending process to produce a drink. The ridges or ledges may be configured to enable easily reproduce drinks.

Smoothies (e.g., fruit, ice, vegetables, etc.) or other food may be provided in the working volume 26 before the blending volume reduction device 30 is positioned into the container 12. In addition or in the alternative, spices or other food may be provided in the working volume 26 after the blending volume reduction device 30 is positioned into the container 12 by removing the plug member 36 from the aperture 34 and inserting the spices or other food into the working volume 26 through the aperture 34. Once the spices or other food are positioned into the working volume 26, the plug member 36 may be positioned back into the aperture 34 and the blade assembly 14 may be operated to blend or grind the spices or other food inside the reduced working volume 26. In embodiments, the plug 36 may comprise a handle or other device, as described herein.

The aperture 34 may be shaped, sized, and disposed in various manners. For instance, the aperture 34 may be disposed near a center or axis Y of the cover member 32, between the center and outer perimeter 38, or the like. The aperture 34 may be generally cylindrical (e.g., circular), an n-sided polygon (where n is a number), irregular in shape (e.g., such as a portion of a cylindrical shape), or the like. In another aspect, the aperture 34 may be formed orthogonally through the cover member 32 and/or at other angles. In another aspect, the aperture 34 may be threaded, or the like, and may be configured to mate with the plug member 36 (which may be threaded to mate with a threaded aperture 34). In at least one example, the plug member 36 may be positioned in the aperture 36 and/or may cover the aperture. For instance, the plug 36 may be configured to cover the aperture 35 without being positioned therein. It is noted that cover member 32 may comprise other or different apertures (e.g., more, less, differently shaped, etc.).

Figure 5:
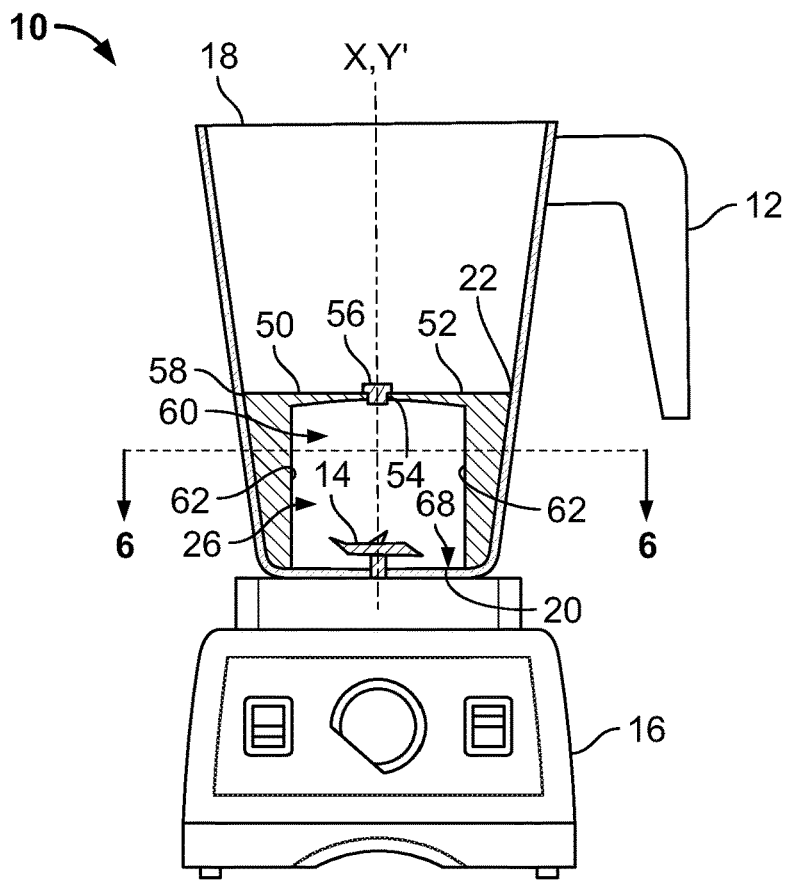
FIG. 5 is a partial cross-sectional view of a blender assembly comprising a blending volume reduction device and shield members, in accordance with various disclosed aspects.
Figure 6:
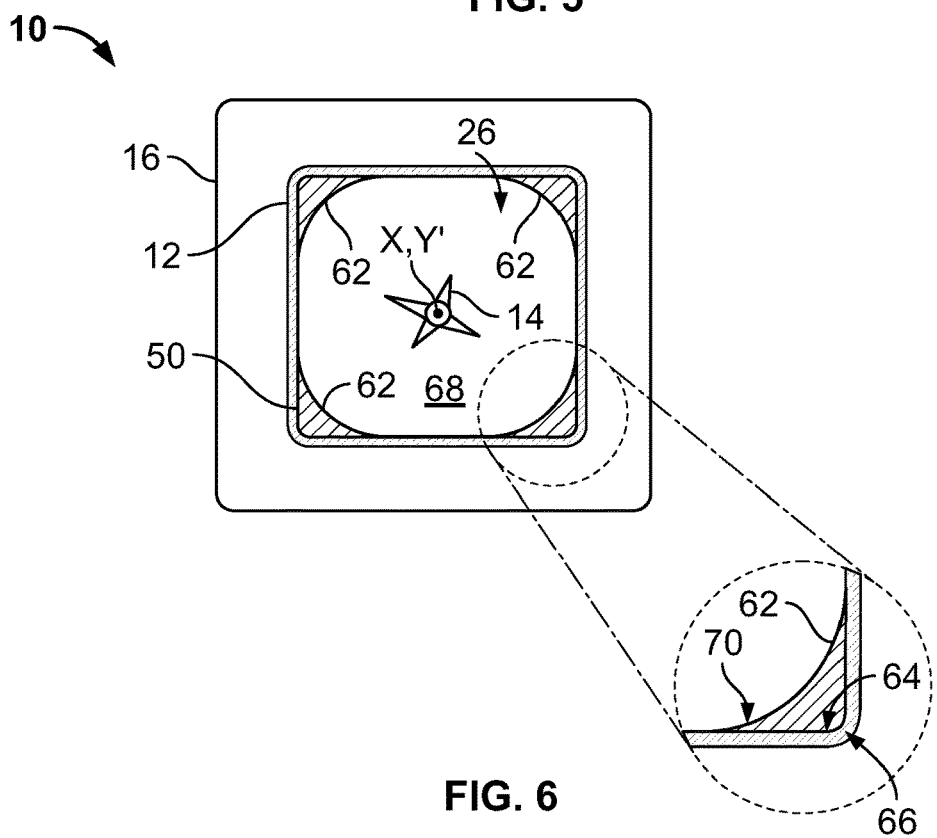
FIG. 6 is a cross-sectional, top view of the blender assembly taken along line 6-6 in FIG. 5, in accordance with various disclosed aspects.

Turning to FIGS. 5 and 6, a blending volume reduction device 50 that may be used in the blender assembly 10 will now be described. The blending volume reduction device 50 comprises a cover member 52 that can comprise an aperture 54 extending therethrough and a plug member 56 removably positioned in the aperture 54. It is noted that liked named components described with reference to FIGS. 1-4 may be similarly configured and/or may comprise similar aspects as those described with reference to FIGS. 5 and 6, unless context suggests otherwise or warrants a particular distinction among such components. For instance, the aperture 54 and aperture 43 may comprise similar sizes and/or dimensions. The blending volume reduction device 50 is configured to be removably positioned into the container 12. The blending volume reduction device 50 is further configured such that when the blending volume reduction device 50 is positioned in the container 12, the blending volume reduction device 50 reduces the working volume 26 of the container 12.

More specifically, the blending volume reduction device 50 comprises an axis Y' and the cover member 52 comprises an outer perimeter 58 that circumscribes the axis Y' and generally matches the intermediate inner perimeter 22 of the container 12. Because the internal, radial cross-sectional area of the container 12 may become smaller along the axis X of the container 12 from the top to the bottom of the container 12, when the blending volume reduction device 50 is positioned into the container 12 such that the axes X and Y' of the container 12 and blending volume reduction device 50 are generally coaxial, the cover member 52 will rest (e.g., mate with container 12, fixedly attach, operatively engage, etc.) at the intermediate inner perimeter 22 of the container 12 and be supported by the side walls of the container 12. For instance, the outer perimeter 58 of the cover member 52 may generally contact the intermediate inner perimeter 22 of the container 12 in a mechanical nesting manner. It is noted that, while embodiments refer to an inner perimeter 22, the blending volume reduction device 50 may rest or mate with a range of inner perimeters 22. For instance, the blending volume reduction device 50 may comprise a material that may be deformable or compressible. For example, the blending volume reduction device 50 may be formed of or may comprise a gasket about the outer perimeter 58 that may be formed of a rubber, foam, or other material. The material may be compressed such that the blending volume reduction device 50 may engagedly secure or rest at a range of inner perimeters 22.

Figure 7:
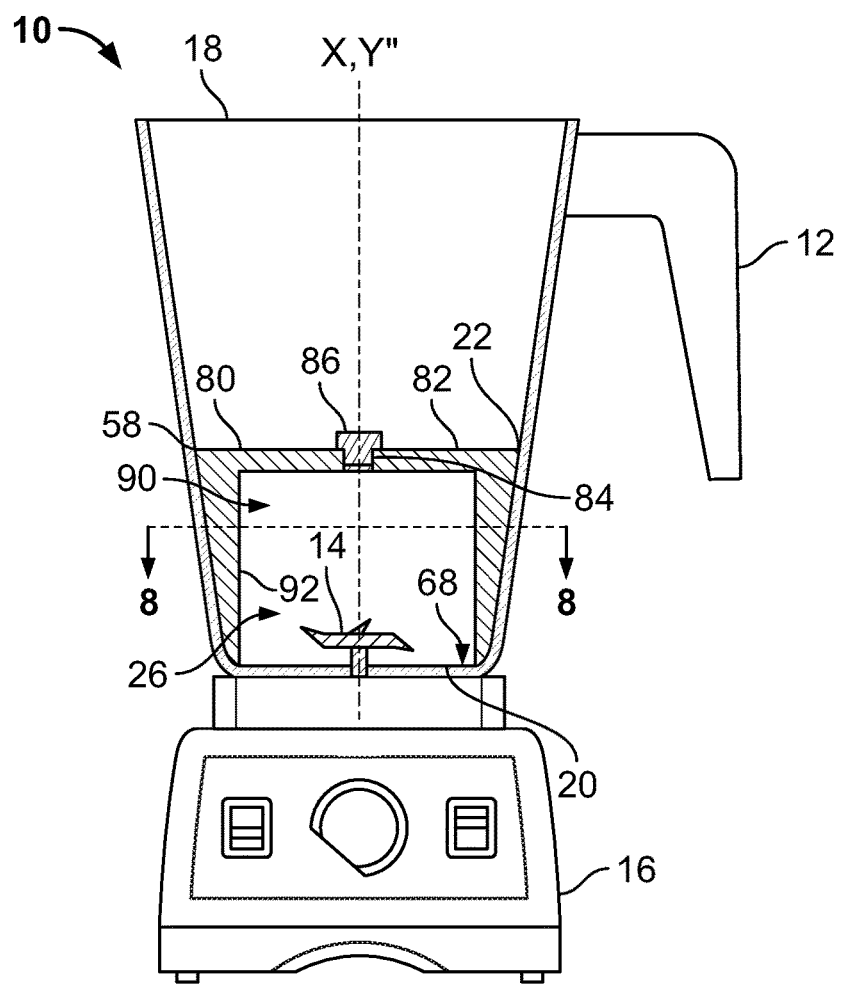
FIG. 7 is a partial cross-sectional view of the blender assembly comprising a blending volume reduction device comprising a circumferential shield member, in accordance with various disclosed aspects.

As described herein, it is noted that the cover member 52 may be additionally or alternatively supported by other means such as those described with regard to cover member 32. For example, hooks that are secured to top edges of the container's side walls or legs that engage the bottom of the container 12 (e.g., as shown in FIGS. 5 and 7). As can be seen in FIG. 5, the cover member 52 will bound a top portion 60 of the working volume 26, thus reducing its size.

The blending volume reduction device 50 further can comprise a plurality of corner shield members 62 that are each configured to extend downward from the cover member 52 between the axis X of the container 12 and a wall portion of the container 12 when the blending volume reduction device 50 is positioned in the container 12. More specifically, each corner shield member 62 is configured to extend along an inner corner surface portion 64 of the container 12 when the blending volume reduction device 50 is positioned in the container 12. In another aspect, each corner shield member 62 may comprise a surface portion 66 that substantially or generally matches an inner corner surface portion 64 of the container 12. In other words, each corner shield member 62 will rest within a corner of the container 12 such that its surface portion 66 is flush with and abuts against its respective inner corner surface portion 64, thus shielding the inner corner surface portion 64 from abrasive spices or other food that may be propelled through the working volume 26 during a blending or grinding operation. It is noted that corner shield members 62 may additionally decrease the working volume 26, provide support for cover member 52, and/or otherwise provide a more efficient blender assembly 10.

One or more of the corner shield member 62 may extend from the cover member 52 such that it contacts a bottom inner surface 68 of the container 12. In at least one embodiment, one or more of each corner shield member 62 may extend only partially towards the bottom inner surface 68. For instance, at least one corner shield member 62 may contact a rib or other protrusion extending from the container 12. The corner shield member 62 may rest on or mate with the protrusion.

Furthermore, each corner shield member 62 may comprise a curved surface 70 that faces the axis X of the container 12 when the blending volume reduction device 50 is positioned in the container 12. More specifically, the curved surface 70 may be concave such that the curved surface 70 opens towards the axis X. Because the surfaces 70 of the corner shield members 62 are curved, spices or other food within the working volume 26 will be less likely to stick to the surfaces 70 of the corner shield members 62 than they would in a sharper corner. It is noted that the corner shield members 62 may be monolithically formed with the cover member 52, may be separately formed with the cover member 52, and/or may be attachable (e.g., removably or irremovably) engagable with the cover member 52.

It is noted that the corner shield members 62 may comprise i corner shield members, where i is a number. In another aspect, the container 12 may comprise j, inner corner surface portions 66. According to at least one example, the number of shield members 62 may be equal to the number of inner corner surface portions 66 (e.g., i=j). For example, the blender assembly 10 may comprise four shield members 62 and inner corner surface portions 66. In an additional or alternative embodiment, the number of shield members 62 and the number of inner corner surface portions 66 may be not equal. For instance, less than all inner corner surface portions 66 may contact and/or mate with shield members 62 (e.g., i<j).

Spices or other food may be provided in the working volume 26 before the blending volume reduction device 50 is positioned into the container 12. In addition or in alternative, spices or other food may be provided in the working volume 26 after the blending volume reduction device 50 is positioned into the container 12 by removing the plug member 56 from the aperture 54 and inserting the spices or other food into the working volume 26 through the aperture 54. Once the spices or other food are positioned into the working volume 26, the plug member 56 may be positioned back into the aperture 54 and the blade assembly 14 may be operated to blend or grind the spices or other food inside the reduced working volume 26.

Figure 8:
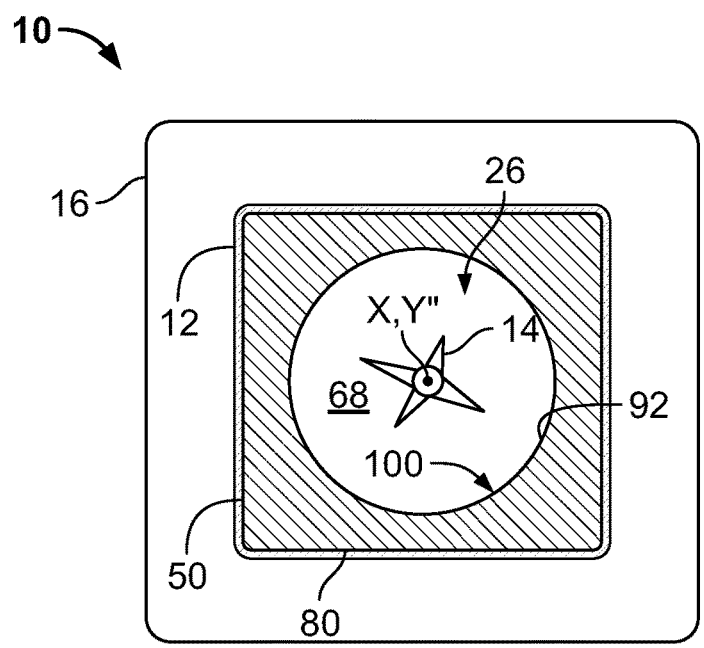
FIG. 8 is a cross-sectional, top view of the blender assembly taken along line 8-8 in FIG. 7, in accordance with various disclosed aspects.

Turning to FIGS. 7 and 8, illustrate is a blending volume reduction device 80 that may be useable with and/or comprised by the blender assembly 10. It is noted that the blending volume reduction device 80 may comprise similar aspects as those described with reference to the other disclosed figures. For instance, liked named components described with reference to FIGS. 1-6 may be similarly configured and/or may comprise similar aspects as those described with reference to FIGS. 7 and 8, unless context suggests otherwise or warrants a particular distinction among such components. The blending volume reduction device 80 comprises a cover member 82 that can comprise an aperture 84 extending therethrough and a plug member 86 removably positioned in and/or covering the aperture 84. The blending volume reduction device 80 is configured to be removably positioned into the container 12. The blending volume reduction device 80 is further configured such that when the blending volume reduction device 80 is positioned in the container 12, the blending volume reduction device 80 reduces the working volume 26 of the container 12. More specifically, the blending volume reduction device 80 comprises an axis Y" and the cover member 82 can comprise an outer perimeter 88 that generally circumscribes the axis Y" and substantially matches the intermediate inner perimeter 22 of the container 12. Because the internal, radial cross-sectional area of the container 12 becomes smaller along the axis X of the container 12 from the top to the bottom of the container 12, when the blending volume reduction device 80 is positioned into the container 12 such that the axes X and Y" of the container 12 and blending volume reduction device 80 are generally coaxial, the cover member 82 will rest at the intermediate inner perimeter 22 of the container 12 and be supported by the side walls of the container 12. However, in other embodiments, the cover member 82 may be additionally or alternatively supported by other means such as those described with reference to the other figures. In an example, hooks that are secured to top edges of the container's side wall or legs that engage the bottom of the container 12. As can be seen in FIG. 7, the cover member 82 may bound a top portion 90 of the working volume 26, thus reducing its size.

The blending volume reduction device 80 can further comprise a generally circumferential shield member 92 that extends downward from the cover member 82 between the axis X of the container 12 and a wall portion of the container 12 when the blending volume reduction device 80 is positioned in the container 12. More specifically, the circumferential shield member 92 extends circumferentially about the axis X of the container 12 when the blending volume reduction device 80 is positioned in the container 12, thus shielding an entire inner perimeter portion of the container 12 from abrasive spices or other food that may be propelled through the working volume 26 during a blending or grinding operation. In another aspect, the circumferential shield member 92 may reduce the working volume 26 and/or otherwise increase user satisfaction with the blender assembly 10. An outer perimeter of the circumferential shield member 92 may substantially match an inner perimeter of the container 12, as shown in FIG. 8. However, the circumferential shield member 92 need not extend all the way to the inner wall surfaces of the container 12. Indeed, in some embodiments, there may be spacing between the circumferential shield member 92 and wall portions of the container 12 and/or the shield member 92 may extend only a portion (e.g., generally a majority, generally a minority, general half, etc.) of a length of the interior of the container 12.

The circumferential shield member 92 may extend from the cover member 82 such that it contacts the bottom inner surface 68 of the container 12 or the circumferential shield member 92 may extend only partially towards the bottom inner surface 68. Furthermore, the circumferential shield member 92 may comprise a curved, inner surface 99 that faces the axis X of the container 12 when the blending volume reduction device 80 is positioned in the container 12. More specifically, the curved, inner surface 99 may be substantially cylindrical and coaxial with the container 12 when the blending volume reduction device 80 is positioned in the container 12, thus providing a surface completely surrounding the axis X that is void of any sharp corners that are likely to accumulate spices or other food within the working volume 26.

It is noted that circumferential shield member 92 may be generally cylindrical, frustoconical, polygonal, or irregular in shape. It is further noted that the circumferential shield member 92 may be monolithically formed with cover member 82, attachable (e.g., irremovably or removably) coupled to cover member 82, separately insertable in the container 12, or the like. In another aspect, circumferential shield member 92 may extend towards bottom inner surface 68 but may not contact the bottom inner surface 68. For instance, the circumferential shield member 92 may contact a protrusion or rib extending from a sidewall of the container, may comprise a friction fit with the side wall of the container, or the like.

Spices or other food may be provided in the working volume 26 before the blending volume reduction device 80 is positioned into the container 12. In addition or in alternative, spices or other food may be provided in the working volume 26 after the blending volume reduction device 80 is positioned into the container 12 by removing the plug member 86 from the aperture 84 and inserting the spices or other food into the working volume 26 through the aperture 84. Once the spices or other food are positioned into the working volume 26, the plug member 86 may be positioned back into the aperture 84 and the blade assembly 14 may be operated to blend or grind the spices or other food inside the reduced working volume 26.

Although the blending volume reduction device 80 described above comprises an outer perimeter 88 that circumscribes the axis Y" and generally matches the intermediate inner perimeter 22 of the container 12, there may be embodiments wherein the outer perimeter does not substantially match any inner perimeter of the container 12. Since the shield member 92 extends circumferentially about the axis X, Y", it is not necessary for the cover member 82 to extend beyond the outer perimeter of the shield member 92 to the side walls of the container 12 for the cover member 82 to enclose the working volume 26. Moreover, the blending volume reduction device 80 may rely on the shield member 92 to support the blending volume reduction device 80 within the container 12 rather than relying on the side walls of the container 12 to support the cover member 82. Accordingly, the outer perimeter 88 of the cover member 82 in some embodiments may be smaller in dimension about the axis X than an inner perimeter of the container 12.

Further, it should be understood that while the present teachings state a blending volume reduction device and/or a spice grinding tool, the present teachings may apply to any situation in which the working volume 26 of the container 12 is desired to be reduced. In such circumstances, a blending volume reduction device may be utilized to reduce the working volume 26 of the container 12. By way of a non-limiting example, the blending volume reduction device may be used to reduce the working volume 26 of the container 12 to blend ice, or any other food stuffs.

Figure 9:
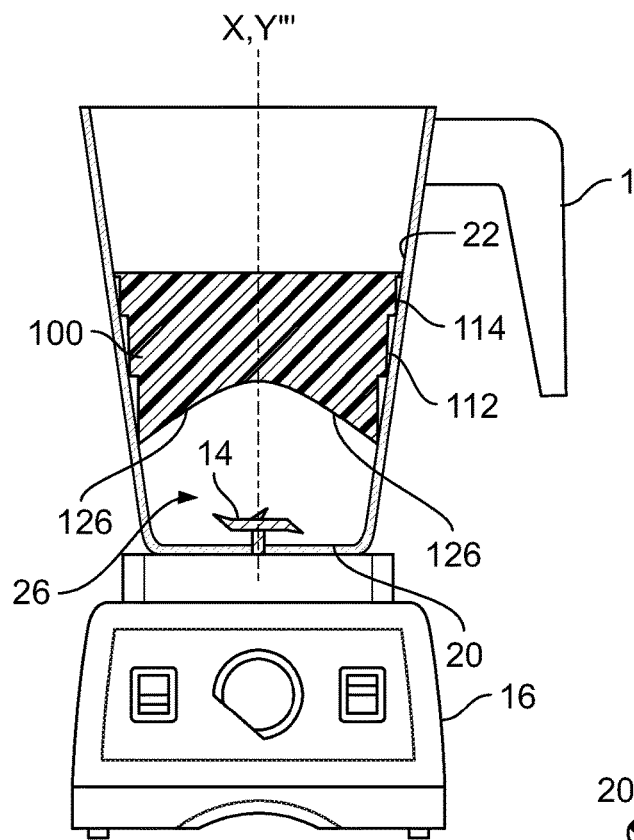
FIG. 9 is a cross-sectional view of a blender assembly with a blending volume reduction device comprising a curved surface, in accordance with various disclosed aspects.

An embodiment of a blending volume reduction device 100 is shown in FIG. 9. The blending volume reduction device 100 may be particularly fitted to blending foodstuffs such as smoothies and the like. The blending reduction device 100 may accelerate the blending of the foodstuffs within the container 12. The blending reduction device 100 may also alter (e.g., improve) the quality of the blended foodstuffs. By way of a non-limiting example, it may take approximately thirty seconds or so to appropriately blend a smoothie in a traditional blending device container. Utilizing the blending volume reduction device 100 may reduce the overall blending time for such appropriately blended smoothie to about six to eight seconds. This has particularly utility in commercial blending or other blending settings where reducing the time to blend foodstuffs may increase the production of smoothies.

The blending volume reduction device 100 comprises a body 112. The body 112 may be generally solid, hollow, filled with a vibration absorbing material, or the like. In an aspect, the body 112 can comprise apertures (not shown) and/or a recessed portion extending therein. The recessed portion may comprise a finger-hole or tab that me be formed to generally allow a user to insert his or her fingers therein so as to manipulate the blending volume reduction device 100 into and out of the container 12. It is noted that a user may manipulate the blending volume reduction device 100 via other mechanisms, such as via an attached (e.g., removably or irremovably) handle, a spatula, tamper, or the like. The blending volume reduction device 100 may be configured to be removably positioned into the container 12. The blending volume reduction device 100 is further configured such that when the blending volume reduction device 100 is positioned in the container 12, the blending volume reduction device 100 reduces the working volume 26 of the container 12.

More specifically, the blending volume reduction device 100 comprises an axis Y''' and the body 112 can comprise an outer perimeter 114 that generally circumscribes the axis Y''' and substantially matches the intermediate inner perimeter 22 of the container 12. Because the internal, radial cross-sectional area of the container 12 becomes smaller along the axis X of the container 12 from the top to the bottom of the container 12, when the blending volume reduction device 100 is positioned into the container 12 such that the axes X and Y''' of the container 12 and blending volume reduction device 100 are generally coaxial, the body 112 will rest at the intermediate inner perimeter 22 of the container 12 and be supported by the side walls of the container 12. However, in other embodiments, the body 112 may be additionally or alternatively supported by other means such as those described with reference to the other figures. For example, hooks that are secured to top edges of the container's side walls or legs that engage the bottom of the container 12. In an aspect, this may allow the blending volume reducing device 100 to be utilized with a container having generally flat walls (e.g., zero-slant walls) which may be generally parallel to each other and/or generally orthogonal to a bottom and/or top surface of a container. It is further noted that the curved, inner surface 126 may contact one or more of the bottom inner surface 68 or a rib/protrusion extending from at least one of the bottom inner surface 68 or a side wall of the container 12. As can be seen in FIG. 9, the blending volume reduction device 100 may bound a top portion 120 of the working volume 26, thus reducing its size.

The body 112 of the blending volume reduction device 100 can further extend downward between the axis X of the container 12 and a wall portion of the container 12 when the blending volume reduction device 100 is positioned in the container 12. More specifically, the body 112 of the blending volume reduction device 100 extends circumferentially about the axis X of the container 12 when the blending volume reduction device 100 is positioned in the container 12, thus shielding an entire inner perimeter portion of the container 12 from foodstuffs, such a smoothies being propelled through the working volume 26 during a blending or grinding operation. An outer perimeter 114 of the body 112 may substantially match an inner perimeter 22 of the container 12, as shown in FIG. 9. In another aspect, the outer perimeter 114 may comprise a compressible or alterable material. For example, the outer perimeter 114 may comprise a foam, rubber, soft plastic, or other material that may have elastic, anelastic, or viscoelastic properties. As such, the outer perimeter 114 may not match the inner perimeter 22 when the blending volume reduction device 100 is not positioned in the container, but the outer perimeter 114 may be compressed or altered to match the inner perimeter 22 when the blending volume reduction device 100 is positioned in the container.

The body 112 may extend only partially towards the bottom inner surface 68. Furthermore, the body 112 may comprise a curved, inner surface 126 that faces the bottom of the container 12 when the blending volume reduction device 100 is positioned in the container 12. More specifically, the curved, inner surface 126 may be substantially concave or convex. In another aspect, the curved, inner surface 126 may be coaxial with the container 12 when the blending volume reduction device 100 is positioned in the container 12, thus providing a surface completely surrounding the axis X that is void of any sharp corners within the working volume 26. It should be understood, however, that the inner surface 126 may be of any appropriate shape. By way of a non-limiting example, it may be generally flat, rectangular, curvilinear, sinusoidal, frustoconical, diamond-like in shape, etc. The inner surface 126 may be of a shape and size that generally prevents contacting the blade assembly 14.

Foodstuffs such a fruit, vegetables, flavoring, ice and the like may be provided in the working volume 26 before the blending volume reduction device 100 is positioned into the container 12. Once the fruit, vegetables, flavoring, ice and the like are positioned into the working volume 26, the blending volume reduction device may be positioned into the container 12 and the blade assembly 14 may be operated to blend or grind the fruit, vegetables, flavoring, ice and the like inside the reduced working volume 26.

The outer perimeter 114 of the blending volume reduction device 100 may circumscribe the axis Y''' and substantially matches the intermediate inner perimeter 22 of the container 12. This may allow the blending volume reduction device 100 to be positioned within the container 12 and operatively held in a predetermined position. This predetermined position may correspond or otherwise relate to the amount of a foodstuff being blended in the container 12. For example, the blending volume reduction device 100 may fit within a container 12 such that the working volume 26 is reduced to a predetermined size, e.g., 8, 12, 16, 20 ounces, etc.

Further still, the blending volume reduction device 100 may include a seal that generally surrounds the perimeter of the blending volume reduction device 100. The seal may generally prevent the foodstuffs (especially the liquid) from moving past the blending volume reduction device 100. The seal may be of any appropriate form. By way of a non-limiting example, it may include an elastomeric material that forms a liquid and/or air tight seal with the container 12. The seal may be similar in concept to a windshield wiper-type seal. The present teachings, however, are not limited to this configuration. Any appropriate type of seal may be utilized without departing from the present teachings. The seal may allow air to escape from the container 12 as the blending volume reduction device 100 is positioned into the container 12. It is further noted that the seal may be attached to, monolithically formed with, or otherwise positioned in contact with at least one of the blending volume reduction device 100 or the container 12. For example, in an embodiment the seal may be attached to the outer perimeter 114. In another example, the seal may be attached to the container 12.

Figure 10:
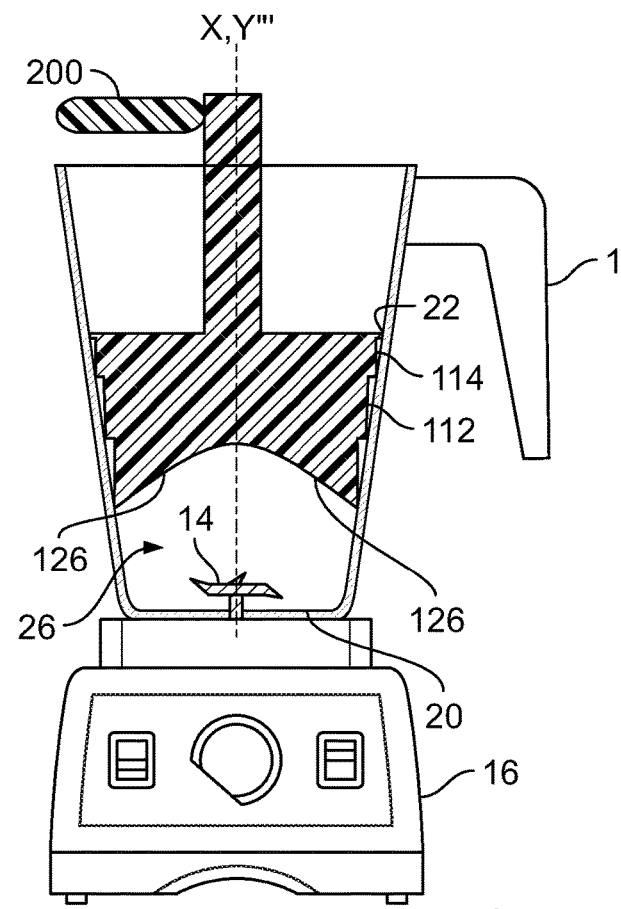
FIG. 10 is a cross-sectional view of a blender assembly with a blending volume reduction device comprising a handle, in accordance with various disclosed aspects.
Figure 11:
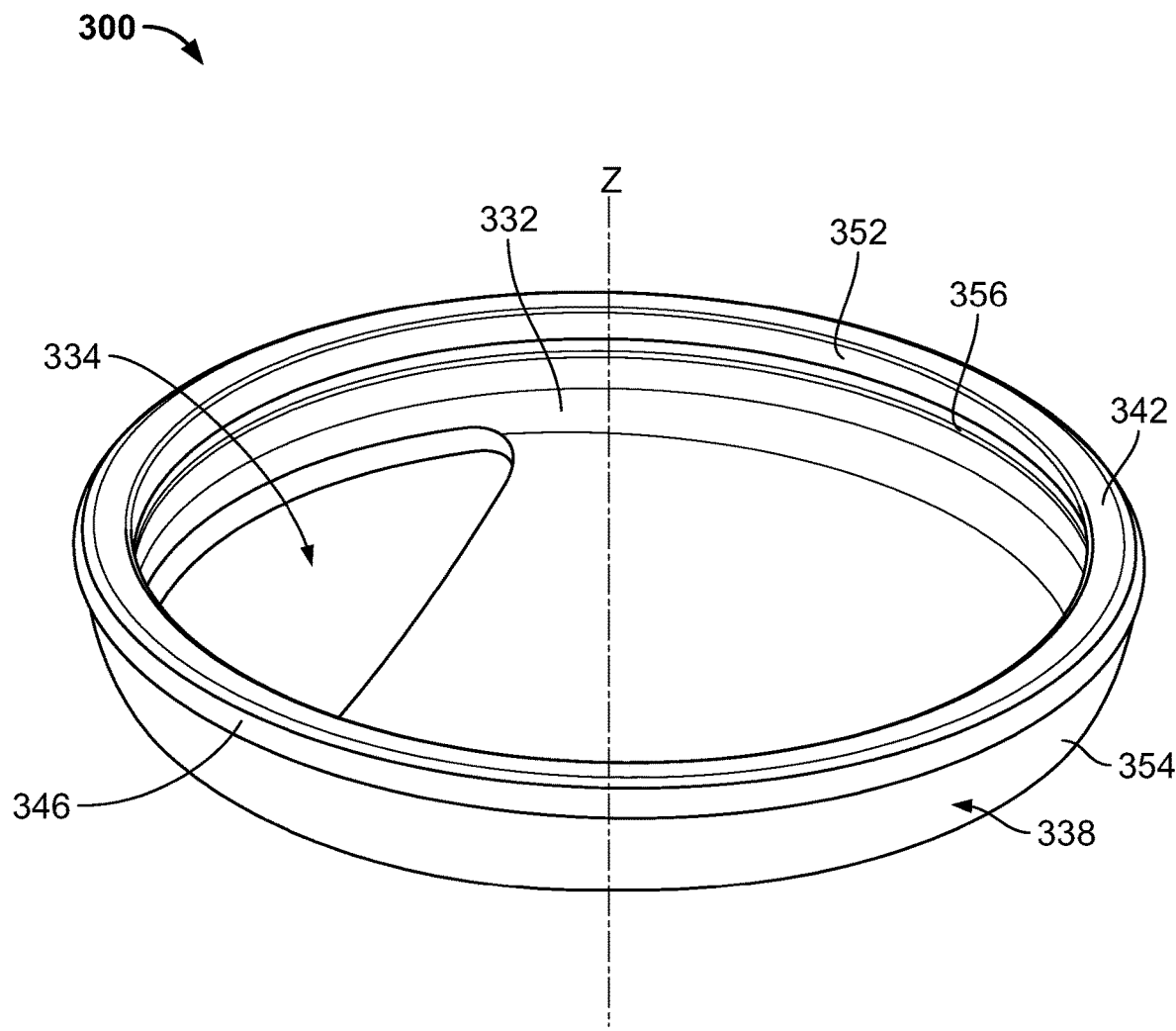
FIG. 11 is a perspective view of a blending volume reduction device, in accordance with various disclosed aspects.
Figure 12:
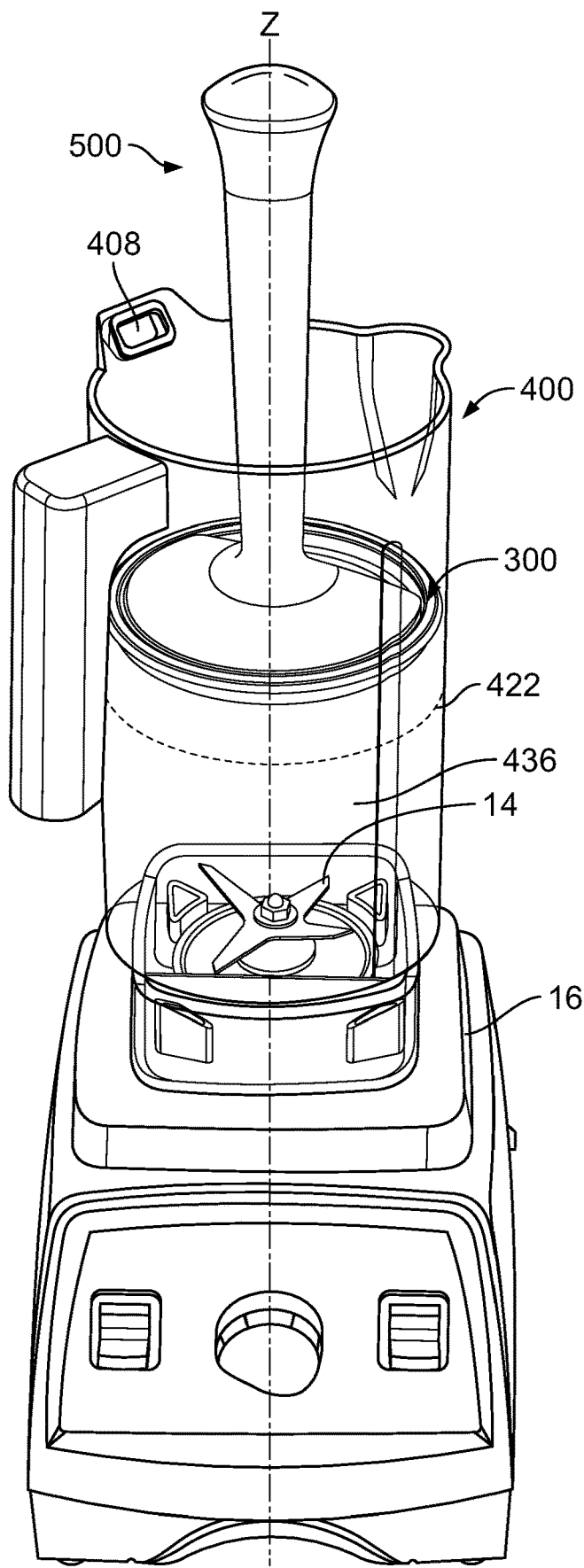
FIG. 12 is a front perspective view of a blender assembly with a blending volume reduction device comprising a handle, in accordance with various disclosed aspects.

As shown in FIG. 10, the blending volume reduction device 100 may include a handle 200. The handle 200 may assist the user with manipulating the blending volume reduction device 100 into and out of the container 12. Further, the handle 200 may allow a user to break any kind of seal that may be created during the blending operation, especially the seal between the blending volume reduction device 100 and the container 12. For example, the working volume 26 may become pressurized during a blending process. The user may utilize handle 200 to manipulate the blending volume reduction device 100 and break a seal to release the pressure.

It is noted that the handle 200 may be monolithically formed with the body 112, may be selectively attached thereto (e.g., removably or irremovably), or the like. It is further noted that the handle 200 may be utilized with other embodiments described herein. For instance, handle 200 may be selectively attached to blending volume reduction device 30, such as via aperture 34.

The blending volume reduction device 100 is particularly useful in blending smoothies. The blending volume reduction device 100 may reduce the amount of air that is in the working volume 26. By reducing the amount of air therein, when the blending operation begins additional shear forces may be created. This may create a pump-like action whereby the foodstuffs are more efficiently and effectively blended. By way of a non-limiting example, the total time to blend a smoothie may be reduced to approximately six or eight seconds. It is, of course, noted that the time may depend on the type of ingredients, amount of ingredients, or the like. In an aspect, the blending time may be reduced by about 60%-70% of the time a traditional blender would need.

It is noted that the handle 200 may be monolithically formed with the blending volume reduction device 100 and/or may be attachable (e.g., removably or irremovably) to the blending volume reduction device 100. In at least one aspect, the handle 200 may plug or cover an aperture formed through the body 112.

Turning to FIGS. 11-19 describe a blending volume reduction device 300 that may be used in a container 400 that includes generally vertical, parallel walls 402, which may comprise generally zero slant walls. In other words, it may be used with a container that has generally straight walls. In this embodiment, a user may add the foodstuffs into the container. Then the user may insert the blending volume reduction device 400 (such as through use of finger apertures, a handle, or just the body thereof). The blending volume reduction device 300 may by positioned until it comes into contact with the foodstuffs disposed therein. The user may then begin the blending process. In another aspect, the blending volume reduction device 300 may be locked or secured in a desired position, may contact hard stops (e.g., such as hard stops protruding from the container 400, or the like).

According to at least one embodiment, the blending volume reduction device 300 may comprise a cover member 332. The cover member may comprise an outer perimeter 354 that may be generally cylindrical or circular. In an aspect, the outer perimeter 354 may comprise a similar shape as an intermediate inner perimeter 422 of the container 400. For instance, the inner perimeter 422 may be generally rectangular, and the outer perimeter 354 may be similarly shaped thereto. It is further noted that the inner perimeter 422 may comprise formations, such as protrusions (e.g., ribs, etc.) and the outer perimeter 354 may comprise similar formations (e.g. recessed portions) configured to mate or match the protrusions of the inner perimeter 422.

In another aspect, the cover member 332 may be generally flat, convex, concave, and/or irregular in shape, or the like. It is noted that the cover member 332 may be any desired shape or size. The cover member 332 may include an aperture 334 disposed therethrough. The aperture 334 may be configured to allow a user to add ingredients to the container 400 while the blending volume reduction device 300 is disposed in the container 400. As depicted, the aperture 334 may comprise a portion or slice of a cylindrical shape. It is noted that the cover member 332 may comprise other or different apertures. For instance, the cover 332 may comprise a different number of apertures, apertures of various shapes (e.g., crescent shape, cylindrical, polygonal, etc.) and/or sizes, or the like.

The blending volume reduction device 300 may comprise a side wall 338 extending from the cover member 332. In an aspect, the side wall 338 may extend generally perpendicularly with the cover member 332. For instance, the side wall 338 may be generally cylindrical. It is noted that the side wall may comprise other configurations. For example, the side wall 338 may be generally frustoconical, polygonal, or irregular in shape. According to embodiments, the side wall 338 may comprise a lip 342 that may protrude therefrom. The lip 342 may be generally perpendicular with the side wall 338. In an aspect, the lip 342 may generally extend outwardly from axis Z. The lip 342 may prevent a gasket or seal member 346 from becoming accidentally displaced. For instance, a user may press or pull the blending volume reduction device 300 in or out of the container 400. As the blending volume reduction device 300 translates about the axis Z, the seal member 346 may rub or contact the walls 402. Friction may act on the seal member 346. The lip 342 may prevent the seal member 346 from being displaced. In another aspect, the seal member 346 may be integrally formed with the side wall 338. It is further noted that the seal member 346 may be held in place via other means, such as via a groove formed in side wall 338, or the like. Moreover, while blending volume reduction device 300 is described as comprising side wall 338, it is noted that blending volume reduction device 300 may comprise a generally solid body, such as a puck-like body.

The blending volume reduction device 300 may be attachable with a handle. The handle may comprise different configurations, shapes, and/or sizes. For instance, the blending volume reduction device 300 may be operatively attached to handle 200, 500 and/or 550. Handle 500 is illustrated as comprising a generally tube like body 504 that may be attached (e.g., removably or irremovably) to handle cover member 508 at a first end 512 opposite a second end 516. It is noted that the body 504 may be generally uniform in shape, cylindrical, frustoconical, a polygonal prism, or otherwise shaped. As depicted, a cross-sectional perimeter of the body 504 may generally increase from proximal the first end 512 towards the second end 516. It is noted that the body 504 may comprise other shapes or sizes. For instance, the body 504 may be generally ergonomically shaped for a user's hand. It is noted that the body 504 may be solid, hollow, or otherwise formed. For instance, the body 504 may comprise a plastic outer shell and a metal inner cored. According to another embodiment, the body 504 may be generally solid and formed of a single material.

Figure 18:
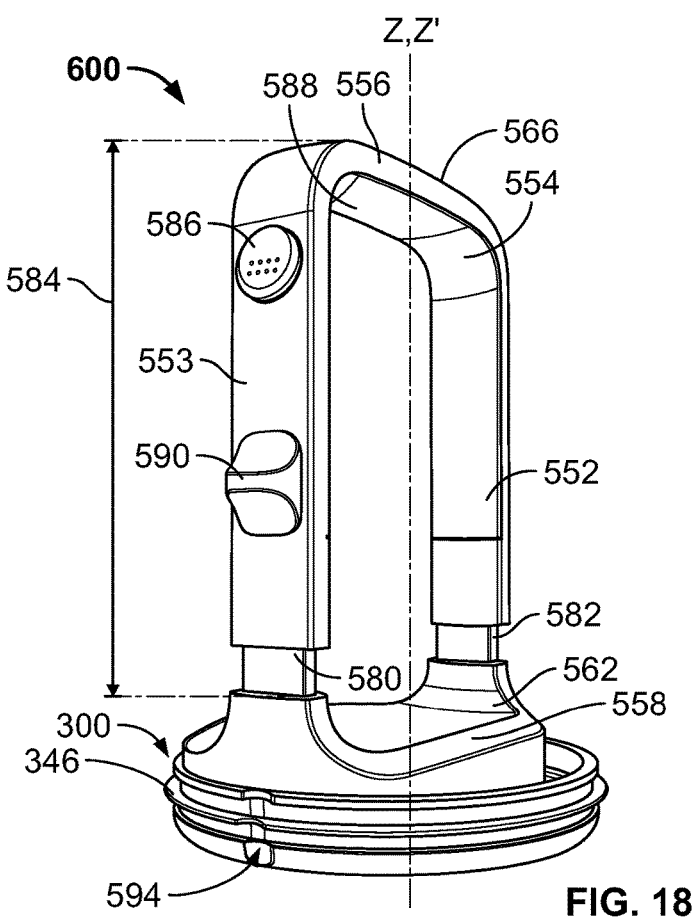
FIG. 18 is a front perspective view of a U-shaped handle coupled to a blending volume reduction device, in accordance with various disclosed aspects.
Figure 19:
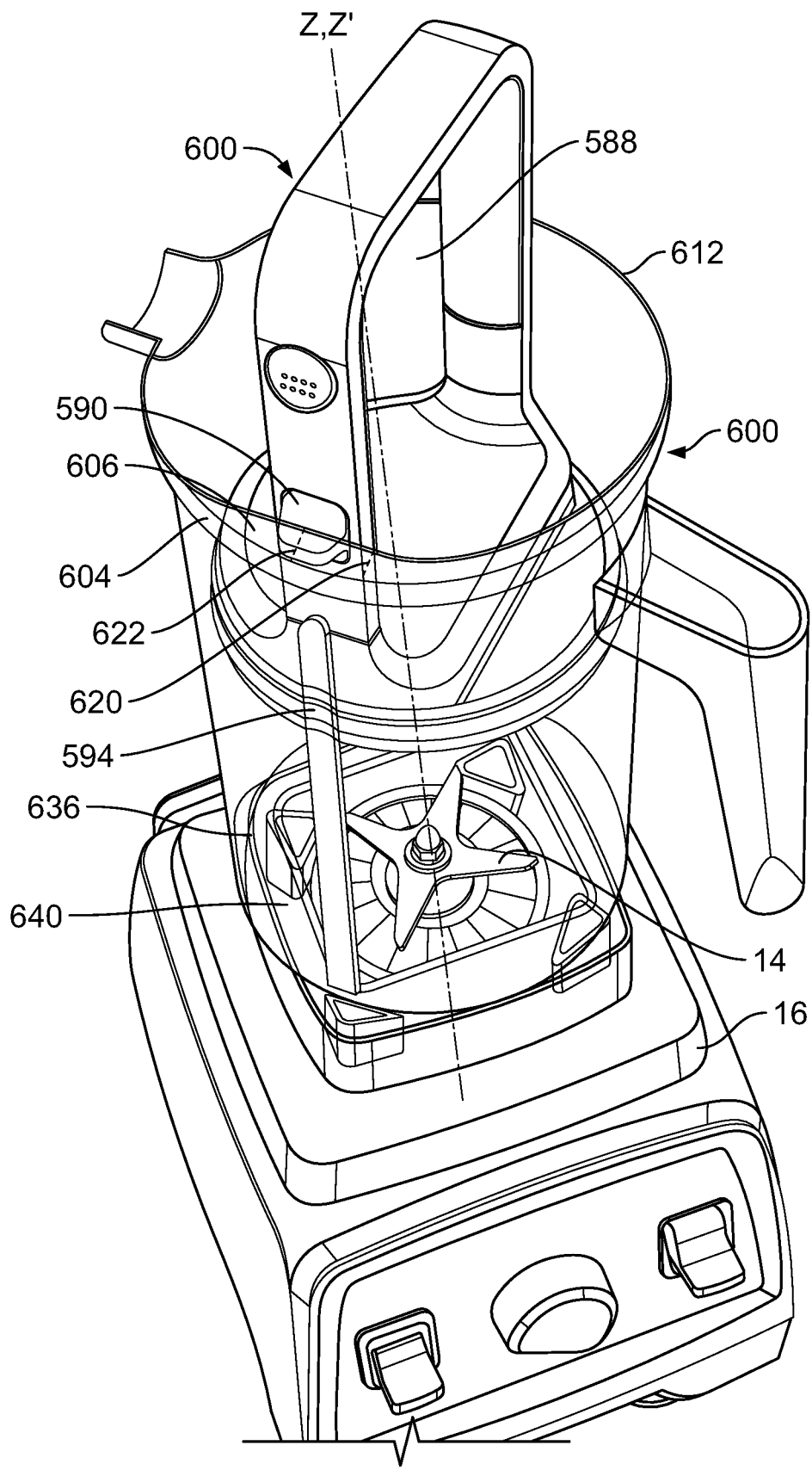
FIG. 19 is a front perspective view of a blender assembly and the U-shaped handle of FIG. 18 coupled to a blending volume reduction device and inserted in a container, in accordance with various disclosed aspects.

As shown in FIGS. 18-19, handle 550 may comprise a generally U-shaped body 554. The U-shaped body 554 may be attached (e.g., removably or irremovably) to handle cover member 558 at a first end 562 opposite a second end 566. It is noted that the body 554 may be generally uniform in thickness or otherwise shaped, such as ergonomically shaped. It is noted that the handle 550 may comprise other or differently shaped handles 550.

In an aspect, the handles 500 and 550 may each operatively couple (e.g., removably or irremovably) with a blending volume reduction device, such as blending volume reduction device 300, blending volume reduction device 30 and/or blending volume reduction device 100. For instance, as shown in FIGS. 12-19 handle cover member 508 and/or 558 may be attached to the blending volume reduction device 300. In an aspect, the handle cover members 508 and 558 may be similar in size and shape. As such, it is noted that while examples may reference one of the handle cover member 508 or the handle cover member 558, examples may utilize either handle cover member 508/558, or both.

Figure 16:
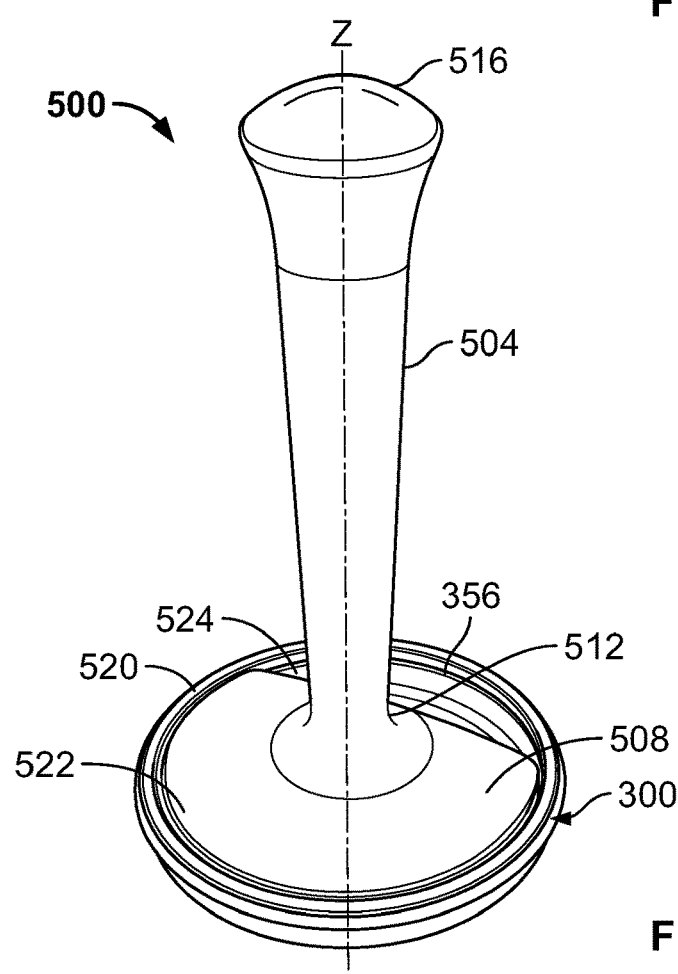
FIG. 16 is a front perspective view of the handle of FIG. 12 coupled to a blending volume reduction device, in accordance with various disclosed aspects.
Figure 17:
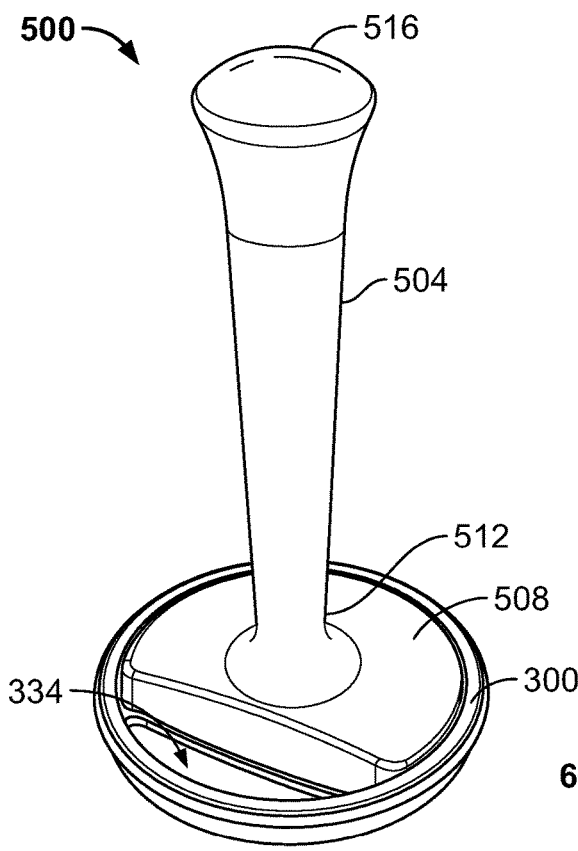
FIG. 17 is a front perspective view of the handle of FIG. 12 coupled to a blending volume reduction device with an exposed aperture, in accordance with various disclosed aspects.

Handle cover member 508 may comprise a partial circular perimeter 520, as described with reference to FIG. 16. The perimeter 520 may comprise a curved portion 522 and an open portion 524. In an example, the curved portion 522 may engage with and/or be connected to the volume reduction device 300. The open portion 524 may be positioned such that the aperture 334 may be selectively covered by handle cover member 508. For instance, the aperture 334 may be at least partially, or completely not covered or exposed, as shown in FIG. 17. It is noted that the all, a majority, half, or a minority of the aperture 334 may be selectively covered by the handle cover member 508. For example, a user may rotate the body 504 to position the handle cover member 508. This may allow the user to selectively expose or cover the aperture 334. Accordingly, the user may add ingredients during a blending process or otherwise access a blended product. In another aspect, covering the apertures 334 with the handle cover member 508 may seal contents within the working volume 436. The seal may allow a threshold amount of air to pass therethrough, as described herein. In another aspect, the seal may be tight enough to prevent foodstuff from being expelled through the seal. In at least one embodiment, the seal may be airtight and a user may rotate the handle cover member 508 to release the seal and release pressure in the container 400. It is noted that the handle cover member 508 may comprise other shapes or sizes. In an example, the handle cover member 508 may not comprise open portion 524. According to other examples, a separate plug portion may be operatively insertable into the aperture 334, such as described with reference to FIGS. 3 and 7.

In at least one embodiment, the perimeter 520 may be sized to mechanically nest within side wall 338. For instance, at least a portion of the perimeter 520 may be about equal to a portion of the perimeter of the inner side wall 352, such that the handle cover portion 508 may be positioned within the inner side wall 352. In an example, the curved portion 522 may comprise about half of a circle and/or ellipse or a major portion of a circle/ellipse (e.g., more than half a circle/ellipse). The handle cover portion 508 may radially press against the inner side wall 352 to form a friction-fit connection. It is noted that the handle cover member 508 may mate with the inner side wall 352 and/or other portions of the blending volume reduction device 300 via other desired mechanisms. For instance, the perimeter 520 and the inner side wall 352 may couple together via a tongue and groove connection, threaded members, magnetic connection, hooks, clasps, VELCRO, suction cups, or other means. For instance, the inner side wall 352 may comprise a groove 356 that may mate with a tongue or tab disposed about some or all of the perimeter 520 (e.g., such as the curved portion perimeter 520) the handle cover member 508. While examples may refer to the perimeter 520 coupling with the inner side wall 352, it is noted that the handle cover member 508 may be coupled with other portions of the blending volume reduction device 300. For instance, the handle cover member 508 may comprise a suction cup, magnet, hook, VELCRO, or other mechanism configured to engage with the cover member 332. In another aspect, handle cover member 508 may mate with lip 342.

According to an aspect, the force needed to separate or detach the handle 500 from the blending volume reduction device 300 may be greater than a downward pulling force experienced when the blending volume reduction device 300 is removed from a container, such as container 400. As such, the blending volume reduction device 300 may be removed from the container 400 with a reduced risk of blending volume reduction device 300 disengaging with the handle 500. In at least one embodiment, the blending volume reduction device 300 and handle 500 may be lockable to prevent separation of the handle 500 and blending volume reduction device 300.

Handle 500 and/or 550 may be configured to control the position of the blending volume reduction device 300. In an aspect, the handles may be locked or secured into a position to achieve a desired working volume within a container. The handles may be held in place by a hook, clasp, magnet, friction connection, or the like, as described here as well as elsewhere in this disclosure. In an example, the working volume may be adjustable by a user. For instance, the user may position the blending volume reduction device 300 based on an amount and/or type of contents within the container.

With reference now to FIGS. 12-15, handle 500 may be positioned within the container 400. The handle 500 may be attached or engaged with the blending volume reduction device 300. The seal member 346 and/or an outer sidewall 346 of the blending volume reduction device 300 may radially seal or press against an inner wall 402 of the container 400. In an aspect, friction between the inner wall 402 and the blending volume reduction device 300 (e.g., the seal member 346) may generally hold the blending volume reduction device 300 at a desired location within the container 400. The user may apply force to the body 504 of the handle 500 to position the blending volume reduction device 300. In an aspect, the container 400 may comprise an engaging portion 408. The engaging portion 408 may comprise a cavity or an aperture 412. The aperture 412 may include a gasket 416 that may be configured to reinforce the aperture 412 and/or reduce ware. The aperture 412 may be configured to receive a coupler or tab 538 of a fulcrum or lever 530. The tab 538 may be angled and/or may comprise a flange to secure the tab 538 with the aperture 412. For example, the lever 530 may be hingedly secured to the container 400 by inserting the tab 538 to the aperture 412.

The lever 530 may comprise a body 532. The body may comprise a grip portion 536 positioned on the body 532, a grooved portion 540, and the tab 538. In an aspect, the tab 538 may be engaged with the aperture 412. The grooved portion 540 may be configured to receive or engage with the second end 516 of the handle 500. In an example, the user may apply force to the body 532 to press the handle 500 downwards. In an aspect, this may allow a user to position the blending volume reduction device 300 with reduced effort. In another aspect, the grooved portion 540 may prevent and/or reduce the likelihood of the lever 530 from slipping. In another aspect, the lever 530 may be hingedly secured to the container 400. For instance, the container 400 may comprise a hinge that may be attachable with the lever 530. It is noted that the lever 530 may be locked in a desired position. In another aspect, a user may hold the lever 530 at a position during a blending process to prevent the blending volume reduction device 300 from moving.

Figure 13:
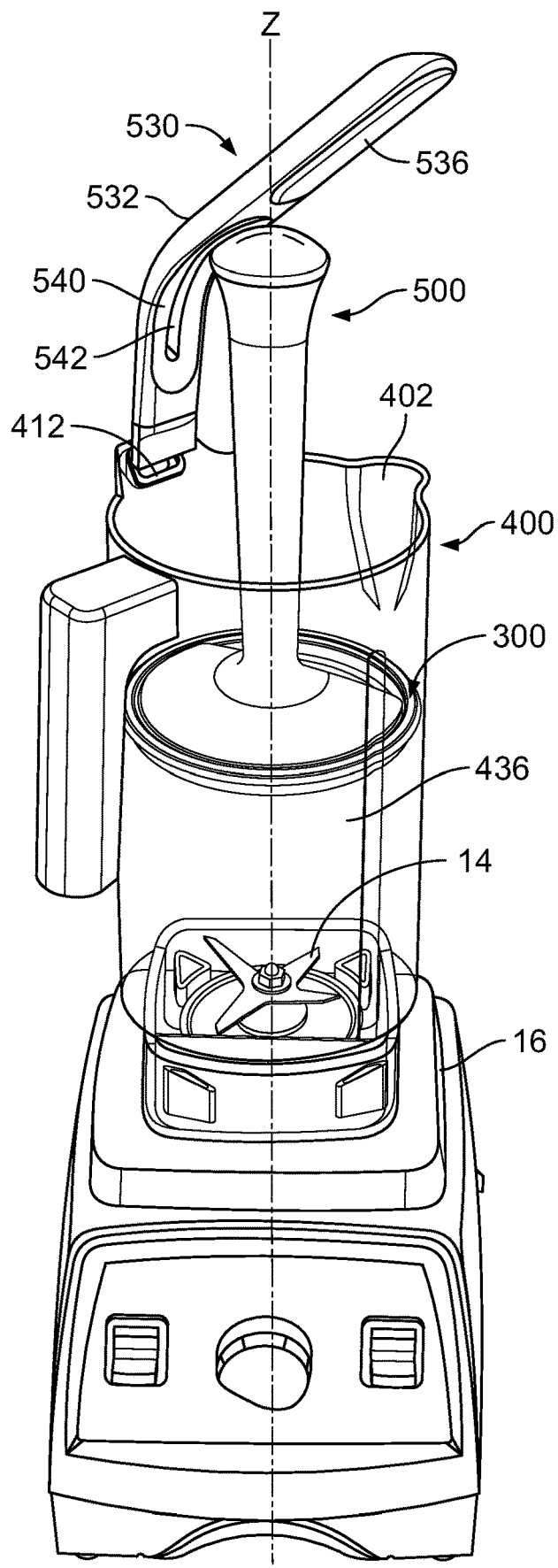
FIG. 13 is a front perspective view of the blender assembly of FIG. 12 with the blending volume reduction device and further comprising a lever in a first position, in accordance with various disclosed aspects.
Figure 14:
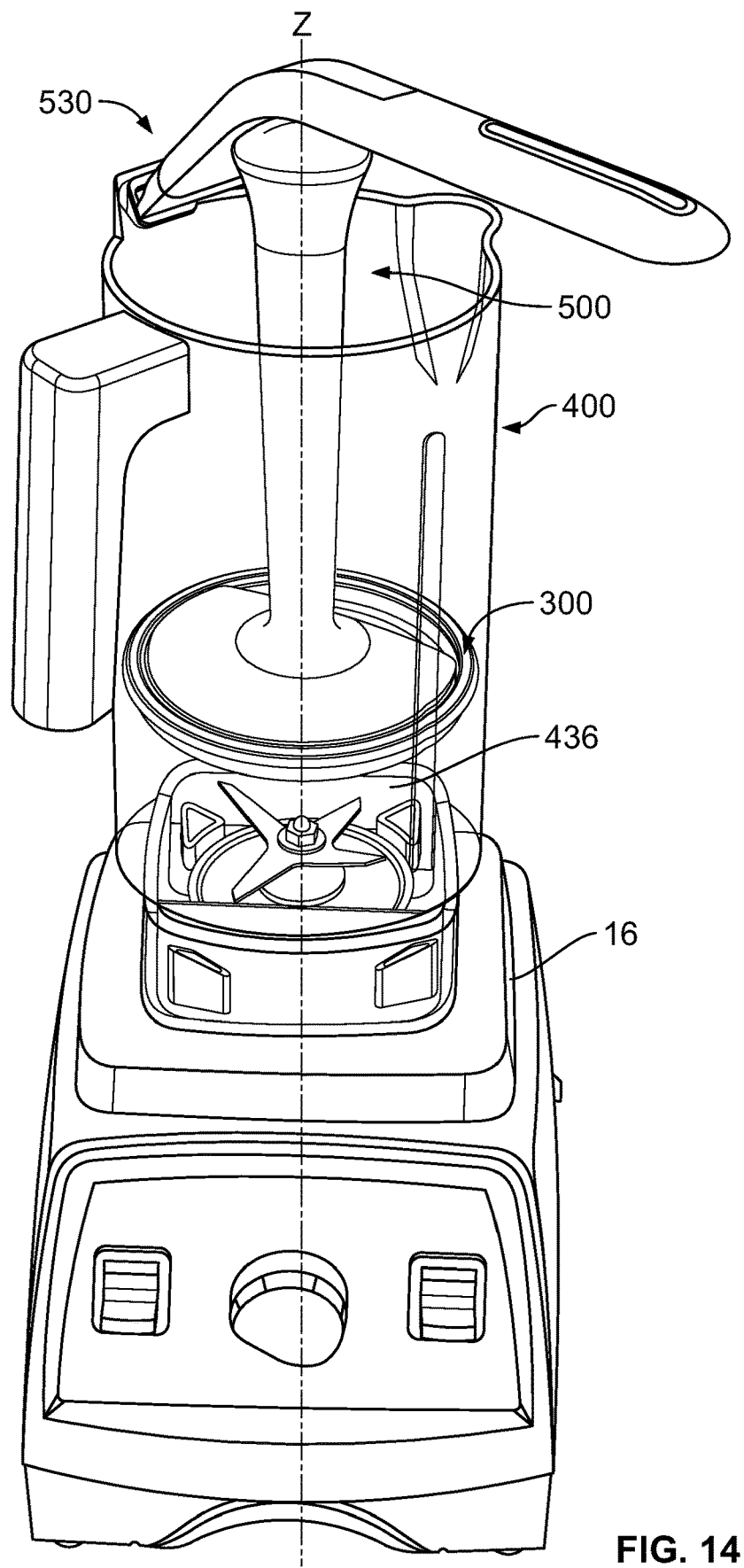
FIG. 14 is another front perspective view of the blender assembly of FIG. 12 with a blending volume reduction device comprising a handle and a lever in a second position, in accordance with various disclosed aspects.
Figure 15:
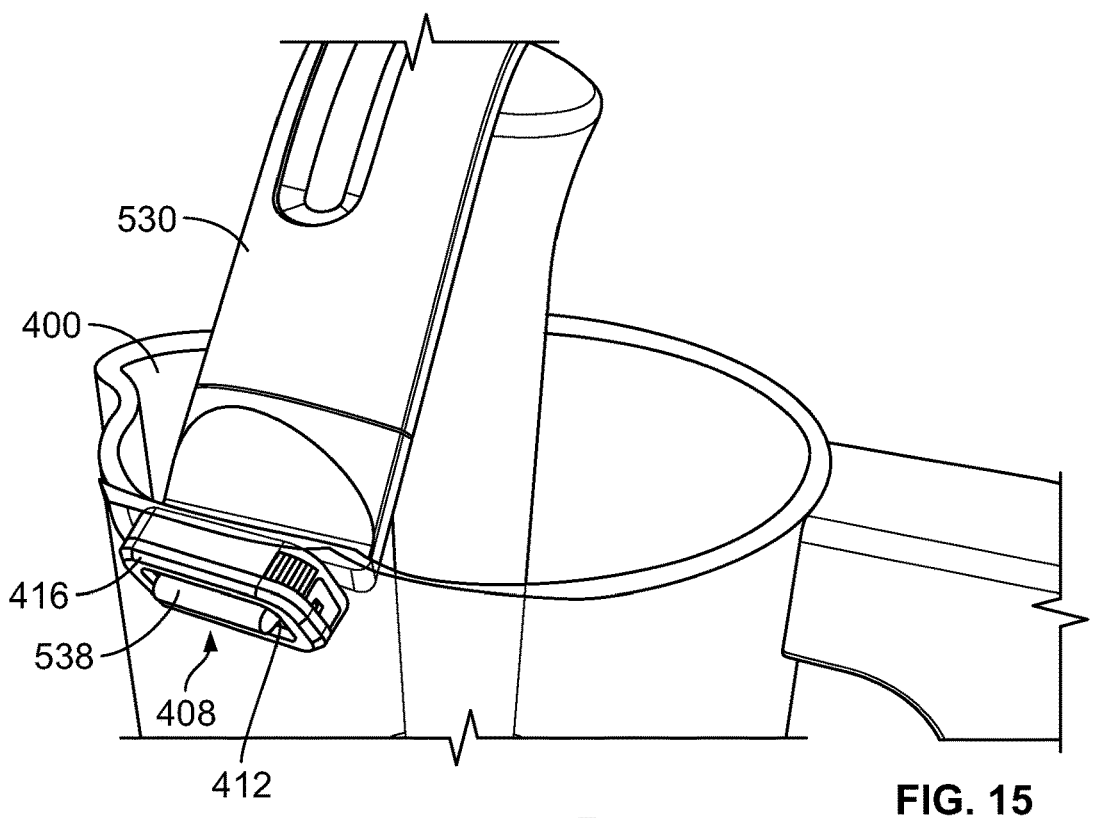
FIG. 15 is an enlarged side perspective view of the blender assembly of FIG. 12 with the blending volume reduction device comprising the handle and the lever coupled to a blending container, in accordance with various disclosed aspects.

In an example, the user may desire to lower the blending volume reduction device 300 from a first position illustrated in FIG. 13 to a second positon illustrated in FIG. 14. The user may attach the lever 530 to the container 400 and may apply force to the lever 530. The lever 530 may transfer the force to the handle 500. As the handle 500 translates towards the blender base 16, the second end 516 and/or the grooved portion 540 may slidably translate with respect to each other. In an aspect, the grooved portion 540 may comprise a material that may reduce friction, may be coated with a non-stick or friction reducing material, or the like.

In at least one embodiment, the handle 500 may be attachable (e.g., removably or irremovably) to the lever 530. For instance, the grooved portion 540 may comprise an aperture or channel 542. The handle 500 may comprise a bolt or other member that may be positioned into the channel 542 and attached to the handle 500. In an example, attaching the handle 500 to the lever 530 may allow the user to apply force to the lever 530 to move the handle 500 towards or away from the blender base 16. It is noted that the user may grasp the handle 500 and manipulate the position of the blending volume reduction device 300 without the lever 530.

In at least one embodiment, the user may adjust the position of the blending volume reduction device 300 thereby adjusting the working volume 436 of the container 400. Spices or other food may be provided in the working volume 436 before the blending volume reduction device 300 is positioned into the container 400. In addition or in the alternative, spices or other food may be provided in the working volume 436 after the blending volume reduction device 300 is positioned into the container 400 by removing the handle 500 and/or rotating the handle 500 to expose the aperture 334 and inserting the spices or other food into the working volume 436 through the aperture 334. Once the spices or other food are inserted into the working volume 436, the handle 500 may be positioned or rotated to cover the aperture 334 and the blade assembly 14 may be operated to blend or grind the spices or other food inside the reduced working volume 436. In another aspect, the user may apply force to the handle 500 (e.g., via body 504 and/or lever 530) to adjust the positon of the blending volume reduction device 300 and/or the working volume 436.

Turning now to FIG. 19, with reference to FIG. 18, there illustrated is a blending system 600. The blending system 600 may include blender base 16, a container 602, the handle 550, and the blending volume reduction device 300. In an aspect, the handle 550 may be attachable to the container 602 to secure the handle 550 in place. In another aspect, the relative position of the first end 562 and the second end 566 of the handle 550 may be selectively altered (e.g., adjustable) as described in more detail herein.

In an embodiment, the body 554 of the handle 550 may comprise an upside down U-like shape. The U-shape may comprise a first side 552, a second side 553, and a third side 556. The first side 552 and the second side 553 may comprise a hollow shell or tube like body that may operatively surround and engage with adjustable arms 580 and 582. The body 554 may translate about axis Z' to expose portions of the adjustable arms 580 and 582. As the portions of the adjustable arms 580 and 582 are exposed and/or covered by the first side 502 and second side 553, a distance 584 between the first end 562 and the second end 566 may alter (e.g., increase or decrease). According to at least one embodiment, the body 554 may be locked or may rest at one or more positions; each position may be defined by a value of the distance 584. In an example, the adjustable arms 580 and 582 may be friction fit within the first side 552 and the second side 553, such that a user may apply force to the body 554 (e.g., by pulling or pushing third side 556) to adjust the position of the body 554.

In another aspect, the handle 550 may comprise one or more actuators that may selectively lock or secure the handle 550 in a desired position. For example, an actuator 586 may comprise a pressure sensitive button that is pressable by a user. When the actuator 586 is pressed, the body 554 and the adjustable arms 580 and 582 may be unlocked. When the actuator 586 is not pressed, the body 554 and the adjustable arms 580 and 582 may be locked in place. In an aspect the actuator 586 may control a peg-lock system internal to the body 554, a spring lock, or other locking mechanism that may be internal or external to the body 554.

According to at least one embodiment, the handle 550 may comprise a grip portion 588. The grip portion 588 may comprise a material that may be relatively softer or more compressible than other portions of the body 554. In another aspect, the material may comprise a non-slip or low slip material. For example, the grip portion 588 may comprise a rubber or soft plastic. In another example, the grip portion 588 may comprise an actuator that may function similar to actuator 586. For instance, the grip portion 588 may be pressable to operatively lock or unlock the body 554 with respect to adjustable arms 580 and 582. In another aspect, grip portion 588 and the actuator 586 may each comprise a portion of an actuator, such that a user must press both grip portion 588 and actuator 586 to alter a position of the body 554. This may prevent or reduce accidental changes in the position of the body 554.

It is noted that the handle 550 may comprise a predetermined number of lockable positions. In another aspect, the handle 550 may comprise one position and may not be adjustable in height. It is further noted that the handle 550 may comprise other means for adjusting the height and/or position of the body 554. Further, while the body 554 may be described as being movable, it is noted that movement may be relative to a fixed location or component. As such, examples generally describe handle cover member 558 in a fixed position and/or adjustable arms 580 and 582 in a fixed position for sake of brevity. Accordingly, the adjustable arms 580 and 582 and/or handle cover member 558 may be movable.

In at least one embodiment, the user may adjust the position of the blending volume reduction device 300 thereby adjusting the working volume 636 of the container 600. Spices or other food may be provided in the working volume 636 before the blending volume reduction device 300 is positioned into the container 600. In addition or in the alternative, spices or other food may be provided in the working volume 636 after the blending volume reduction device 300 is positioned into the container 400 by removing the handle 550 and/or rotating the handle 550 to expose the aperture 334 (or a portion of aperture 334) and inserting the spices or other food into the working volume 636 through the aperture 334. Once the spices or other food are inserted into the working volume 436, the handle 550 may be positioned or rotated to cover the aperture 334 and the blade assembly 14 may be operated to blend or grind the spices or other food inside the reduced working volume 436. In another aspect, the user may adjust the positon of the blending volume reduction device 300 and/or the working volume 436 by altering the distance between the first end 562 and second end 566.

Handle 550 may comprise one or more stops or engagement members 590 that may engage with one or more engagement member 604 of the container 602. The engagement members 590 may engage with the engagement members 604 to hold the body 554 and/or blending volume reduction device 300 in a desired location within the container 602. It is noted that the handle 550 may be configured such that the blending volume reduction device 300 may be prevented from being locked into a position at which a blade assembly 14 may contact the blending volume reduction device 300. For instance, the handle 550 may comprise a maximum distance at which it may expand. This may prevent or reduce the possibility of the handle cover member 558 contacting the blade assembly 14.

In embodiments, the engagement members 590 may comprise a tab or protrusion extending from first side 552 and/or second side 553. The tab may be sized and shaped to operatively engage with the engagement member. The tabs, for example, may be insertable into a groove or channel 606. The channel 606 may comprise an operative portion of the engagement member 604. In an aspect, the channel 606 may be disposed along a sidewall 608 of the container 602. In an example, the container 602 may comprise channels 606 that may be generally opposite each other, such as equidistant about a perimeter of the side wall 608. It is noted that the channels 606 may disposed proximal an open end 612 or at other positions along the side wall 608. The depth of the channel 606 may generally alter (e.g., increase and/or decrease) from a terminal end 620 of the channel towards an intermediate end 622 of the channel. As such, the handle 550 may be rotated about axis Z' such that the tabs may be engaged or received by the channels 606 and/or may be disengaged or released.

As depicted, the engagement members 590 may comprise two tabs, where one tab extends from the first side 552 and a second tab extends from the second side 553. It is noted that the engagement members 590 may comprise different or other tabs, such as a different number of, differently sized, and/or shaped tabs. It is further noted that the engagement members 590 and 604 may comprise other features that may mechanically, magnetically, and/or otherwise facilitate engagement of the handle 550 with the container 602. For instance, the engagement members 590 and 604 may be configured to engage via a friction fit, by a fastener (e.g., clip, hook, magnet, VELCRO, etc.), by threaded members, or the like.

Components of the handle 500 and/or 550 may comprise one or more materials. For example, the materials may include metals, plastics, rubbers, wood, or the like. In an example, the adjustable arms 580 and 582 may comprise a metal such as aluminum and/or stainless steel. In another example, body 504 and/or body 554 may comprise a food grade plastic or the like.

In another aspect, while embodiments refer to blending volume reduction devices, it is noted that such devices may be utilized for other purposes. For instance, handle 500 and/or 550 may be attached with blending volume reduction device 300, and the assembly may be utilized as a tamper to manipulate foodstuff.

In an aspect, container 602 may comprise one or more ribs 640. The ribs 640 may comprise varying heights, sizes, or shapes. It is noted that container 602 may comprise any number of ribs (e.g., 1, 2, 3, 4, etc.). The blending volume reduction device may comprise recessed portions 594 that may be formed through the side wall 338 and/or seal member 336. In an aspect, the recessed portions 594 may comprise slot-like formations that may be generally sized and shaped to allow ribs 640 to pass therethrough. The recessed portions 594 and the ribs 640 may contribute to proper alignment of the blending volume reduction device 300 and the container 602. In another aspect, the recessed portions 594 and the ribs 640 may prevent the blending volume reduction device 300 from rotating, such as due to fluid torque of contents being blended.

In at least one embodiment, the ribs 640 may comprise varying heights and may be generally staggered about the side wall 608 of the container 602. As the recessed portions 594 pass through a first set of the ribs 640, the blending volume reduction device 300 may then be rotated to allow the recessed portions 594 to pass through another set of ribs 640. Each passage through set of ribs 640 may represent a particular position. For example, a blending volume reduction device 300 may be configured to be rotated so that the slots therein will allow the blending volume reduction device 300 to pass by one set of ribs on the container 602. The user may repeat this until the blending volume reduction device 300 is at the appropriate height. Once it is, the blending volume reduction device 300 may be rotated so that the slots are positioned away from the ribs and the blending volume reduction device 300 does not engage the ribs of the container 602. It is noted that the ribs 640 and/or recessed portions 594 may be generally vertically arranged, may be spiralized similar to a threaded member, or the like.

While various embodiments and non-limiting examples have been described with reference to one or more drawings, it is noted that various aspects disclosed herein may be utilized in combination with each other. For instance, the blender volume reduction device 30 may utilize various aspects disclosed with reference to FIGS. 11-19. For instance, the blending volume reduction device 30 may be utilized with and/or comprise handle 200, 500, 550, or the like. In another example, blending volume reduction device 300 may be utilized with and/or comprise corner shield member 62 and/or circumferential shield member 80.

In embodiments, a working volume (e.g., working volume 36, 436, and/or 636) may be limited by a blending volume reduction device (e.g., blending volume reduction device 30 and/or 300) contacting foodstuff within a container (container 12, 400, and/or 600). This may be useful in a situation in which a user wishes to make different sized drinks (such as smoothies) or the like. The user merely needs to add the appropriate amount of foodstuffs into the container and insert the blending volume reduction device until it is adjacent to or otherwise in contact with the foodstuffs. This way, a single container and blending volume reduction device may create a plurality of different sized drinks.

Figure 20:
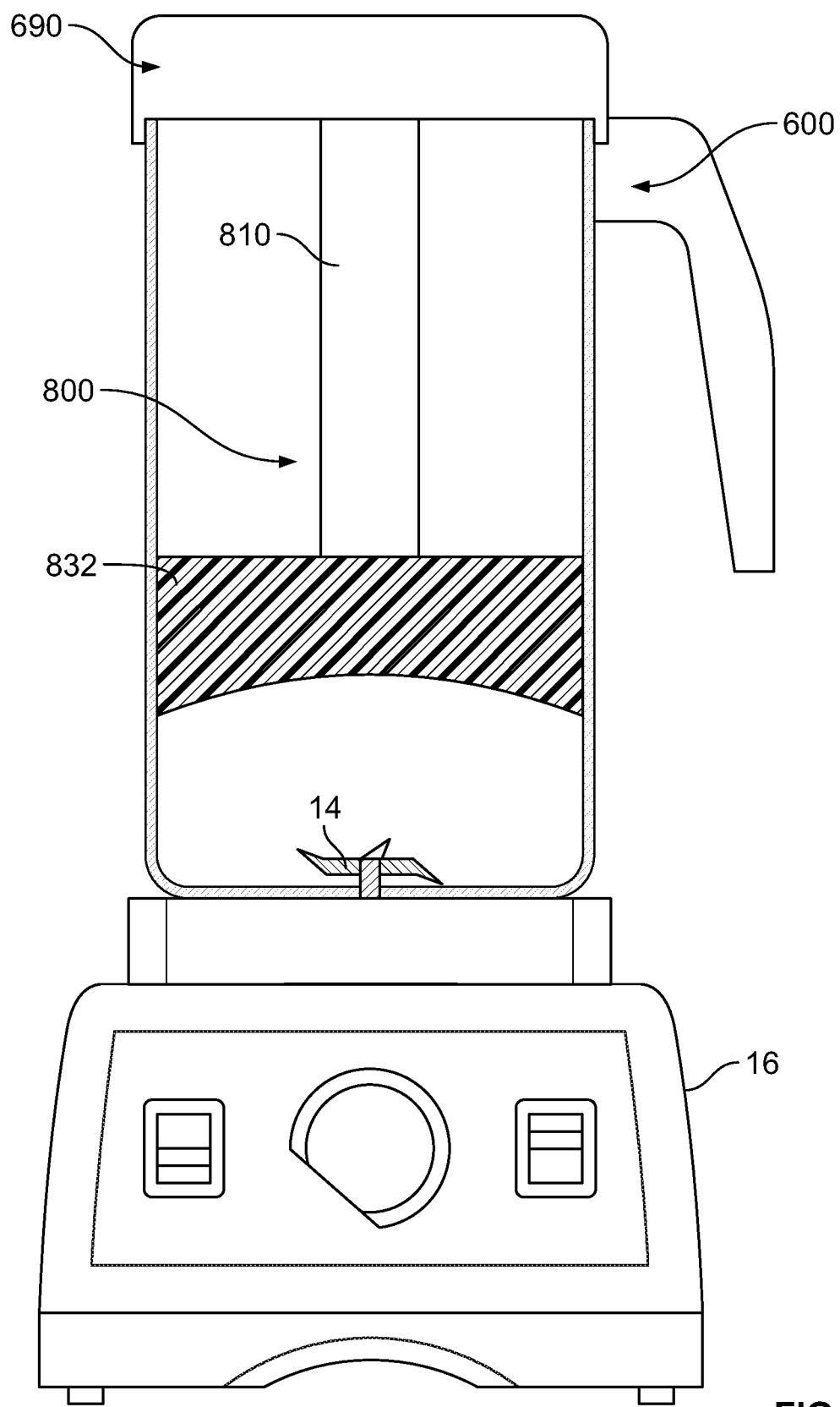
FIG. 20 is a front view of a blender system including a blending volume reduction device operatively attached to a lid, in accordance with various disclosed aspects.

Moreover, described blending volume reduction devices may limit the area of active blending (e.g., working volume), which may increase the efficiency of breaking down ingredients and/or increasing temperatures more rapidly than otherwise. The blending volume reduction devices may include a handle to place such into the container. In some embodiments, the handle may be tall enough to contact or otherwise be part of the container lid. For instance, as shown in FIG. 20, a container lid 690 may be operatively attached to container 400. The lid 690 may cover or close an open end of the container 400. A blender volume reducing device 800 may comprise an arm 810 that may be attached (e.g., removably or irremovably) to a cover member 832 and/or the lid 690. Accordingly to an embodiment, a length of the arm 810 may be alterable such that the working volume 636 may be adjustable.

In accordance with various described aspects, a container may include a stop so that the blending volume reduction device may contact the stop upon insertion into the container. The stop may be of any appropriate configuration. By way of a non-limiting example, the stop may include ribs, flutes, or the like that may positioned on the container. The ribs may be of any appropriate configuration. The ribs may be monolithically formed with the container or attached thereto in a separate process. The stop may prevent the blending volume reduction device from coming into contact with the blades upon insertion into the container.

Figure 21:
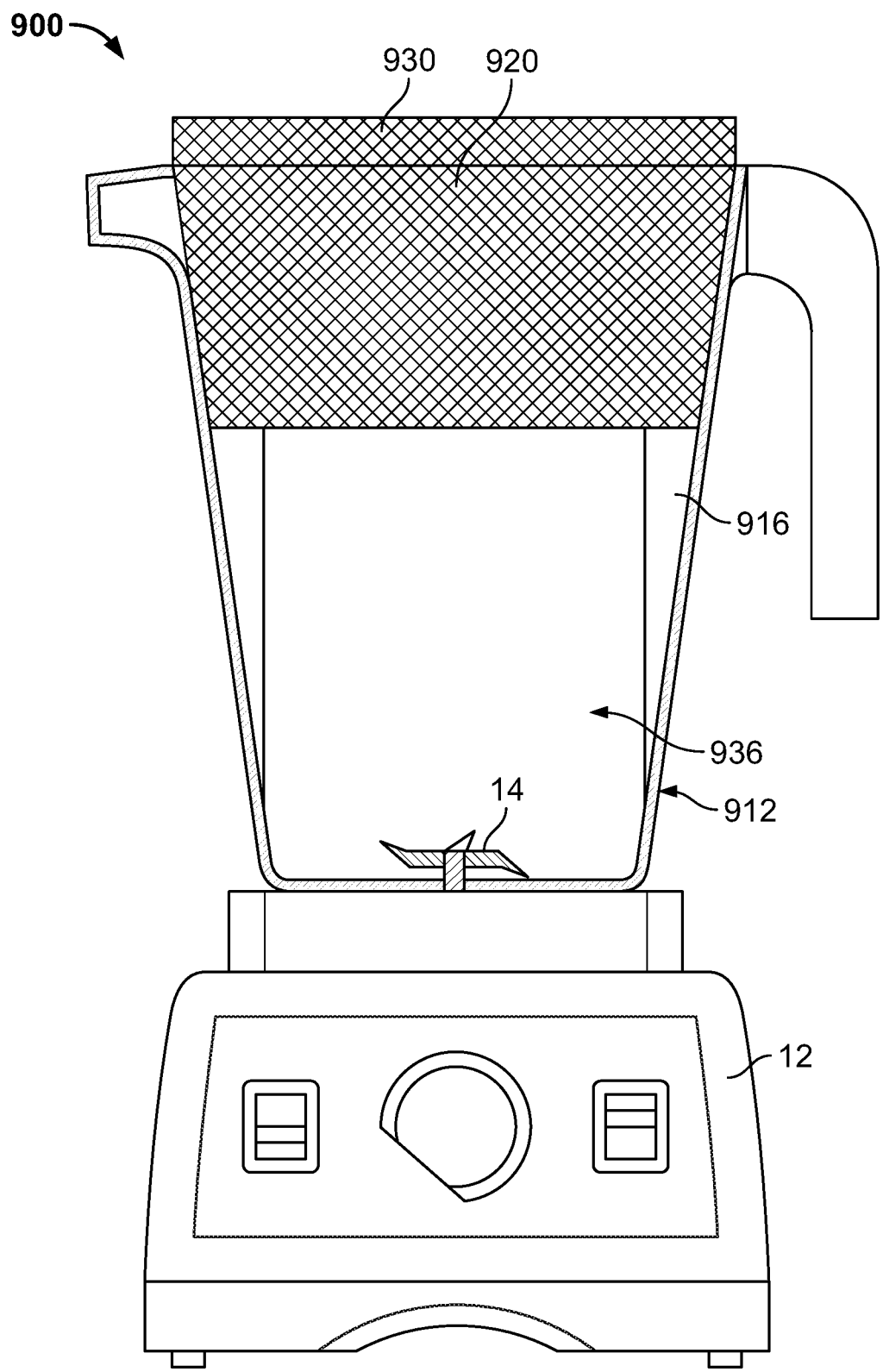
FIG. 21 is a front view of a blender system including a blending volume reduction device operatively engaged with stops of a blending container, in accordance with various disclosed aspects.

Turning to FIG. 21, there illustrated is a blending system 900. The blending system 900 may include a container 912 and a blending volume reducing device 920 that may be integrated with a lid 930. In an aspect, the container 912 may be operatively engaged with blender base 16 to drive blade assembly 14. The container 912 may include stops 916, which may comprise flutes, ribs, or other protrusions extending from an inner wall 918 of the container 912. The stops 916 may be positioned on the container such that a blending volume reduction device 920 is positioned at or immediately above a desired level, such as the level of foodstuff within a container 912. This may also be used as a means to measure the amount of ingredients to be added to the container 912. For example, if a drink is to be made repeatedly, the stops 916 may be positioned on the container so that the user knows how much of the ingredients to add, i.e., the user adds the ingredients to the container until they reach the stop. This may allow a blending volume reduction device 920 to be positioned appropriately in the container 912 for each blend. More specifically, the blending volume reduction device 920 may be positioned in contact with or immediately above the ingredients added.

In another aspect, a stop may be particularly useful in a container that has zero slant walls. In some embodiments, the container may include a plurality of stops positioned on varying locations on the container. This may allow a user to vary the position or height (e.g., distance from a bottom or top of a container) of a blending volume reduction device when positioned into a container. For example, the zero wall container may include ribs of varying heights while a blending volume reduction device may include corresponding slots that may engage the ribs. This may vary the height of a blending volume reduction device in the container. For example, a blending volume reduction device may be configured to be rotated so that the slots therein will allow the blending volume reduction device to pass by one set of ribs on the container. The user may repeat this until the blending volume reduction device is at the appropriate height. Once it is, the blending volume reduction device may be rotated so that the slots are positioned away from the ribs and the blending volume reduction device engages the ribs of the container.

In those embodiments in which the container walls are slanted, the stop may not be necessary, but it may still be used to position the blending volume reduction device at predetermined heights on the container. As noted above, the blending volume reduction device may be of a size to engage the container at a predetermined location. The blending volume reduction device may include a seal that can allow pressure to escape or a vent to release the pressure through the blending volume reduction device.

Still further, the blending volume reduction device may be attached with or be a part of the lid. In these embodiments, the blending volume reduction device may sit deep into the container to reduce the working volume. The blending volume reduction device may be attached with the lid in any appropriate manner. By way of a non-limiting example, the blending volume reduction device may be monolithically formed with the lid, attached such as through adhesives, welding, fastening or the like, or may be selectively attached such that it may be removed when not needed. In another aspect, a blending volume reduction device may comprise an arm that extends from the lid the blending volume reduction device. The arm may have an adjustable height to position the blending volume reduction device a desired distance from the lid.

The blending volume reduction device reducing the working volume of the container may decrease the amount of time required to heat ingredients therein. The blending volume reduction device reduces the amount of space the ingredients may jump and splash around. This may alter (e.g., increase) the efficiency of the blending, which may alter (e.g., decrease) the amount of time needed to heat the ingredients.

Certain blenders may use the friction from the blades to create heat to heat ingredients within the container. The blending volume reduction device may make the heating of the ingredients more efficient and effective. Specifically, the blending volume reduction device may reduce the time necessary for the ingredients to reach a predetermined temperature, i.e., it may heat the ingredients faster than otherwise. By way of a non-limiting example, the heat rise of liquid in the container may be increased by more than 100% with use of the blending volume reduction device when it is positioned about one inch above the liquid during the blending cycle. The blending volume reduction device positioned there reduces the room for the ingredients to splash up or down. As such the heat rise may be increased by more than five times what would otherwise be achieved without the blending volume reduction device.

Utilizing the blending volume reduction device within the container may not only alter (e.g., decrease) the time necessary to blend ingredients in the container, but it may also alter (e.g., decrease) the time necessary to heat the ingredients in the container to a predetermined temperature. The blending volume reduction device allows for a much more effective and efficient blending cycle, including, without limitation heating thereof. The blending volume reduction device may be able to create a heated drink much more quickly than a blending device with only a container.

In another aspect, a blending volume reduction device may be utilized with a personal or small format blending system. For instance, a personal blending system may comprise a single service or cup like container that may be attachable with a blade base. The container may comprise a closed end and an open end. The open end may comprise a threaded portion or other means for attaching to the blade base. In an example, a user may insert foodstuff into the single serving container and may then attach the blade base to the container, such as by mating a threaded portion of the blade base with the threaded portion of the single serving container. According to one or more disclosed aspects, a blending volume reduction device (e.g., 30, 300, etc.) may be positioned into the single serving container prior to inserting the foodstuff The blending volume reduction device may be positioned at a desired location within the single serving container. Foodstuff may be added to the single serving container and the blade base may be attached thereto. Accordingly, the working volume of the single serving container may be adjusted.

In embodiments, a blending volume reduction device may reduce a working volume of a blending container in comparison to a working volume defined by attaching a lid to the container. The working volume may be reduced by a desired amount, such as by about or more than 90%, 75%, 50%, 25%, etc. It is noted that the percentage of reduction may be based on an amount of foodstuff within a container, a size of a container, or the like.

Figure 22:
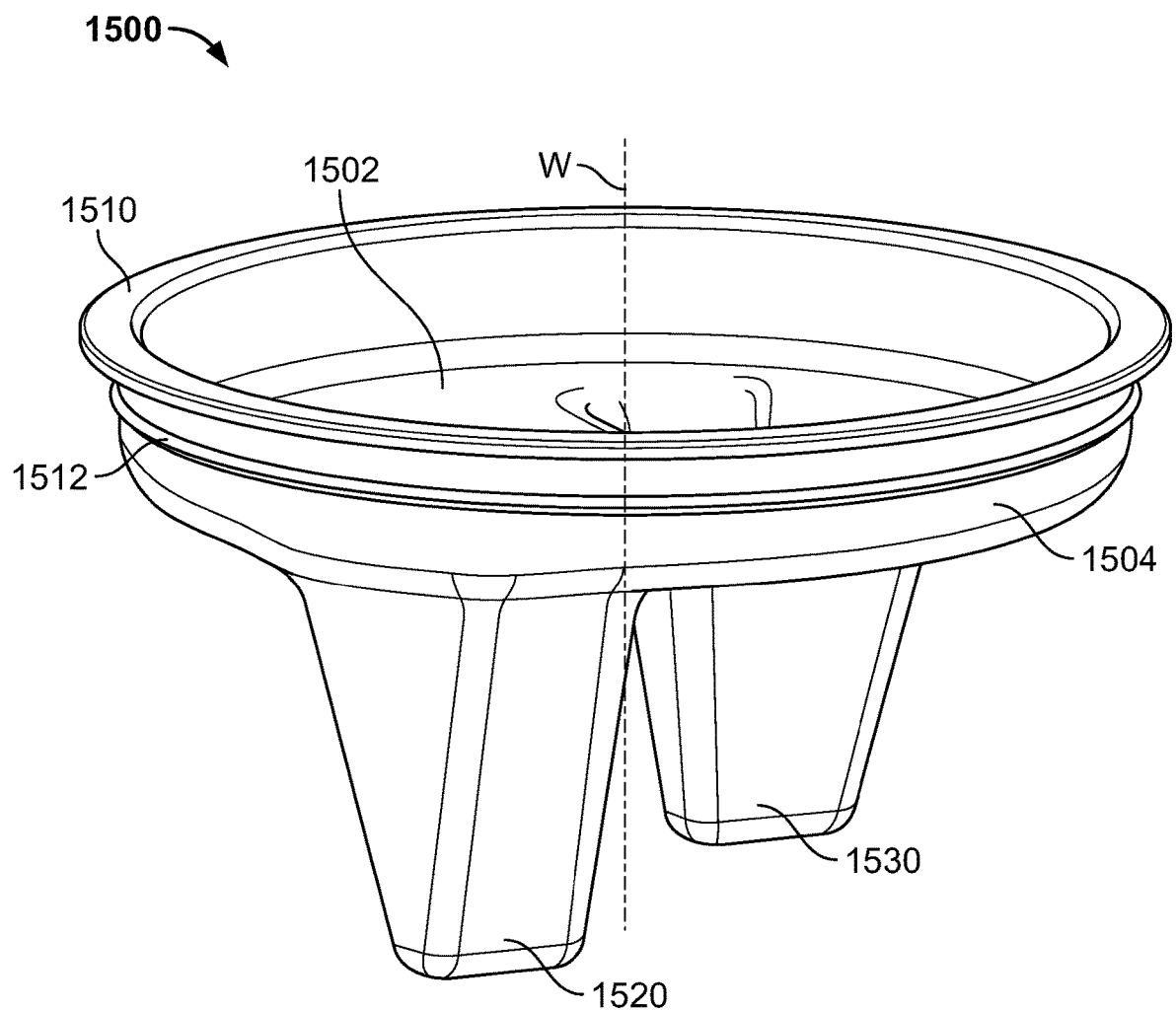
FIG. 22 is a side and front prospective view of a blending volume reduction device including flow impeding members, in accordance with various disclosed aspects.
Figure 23:
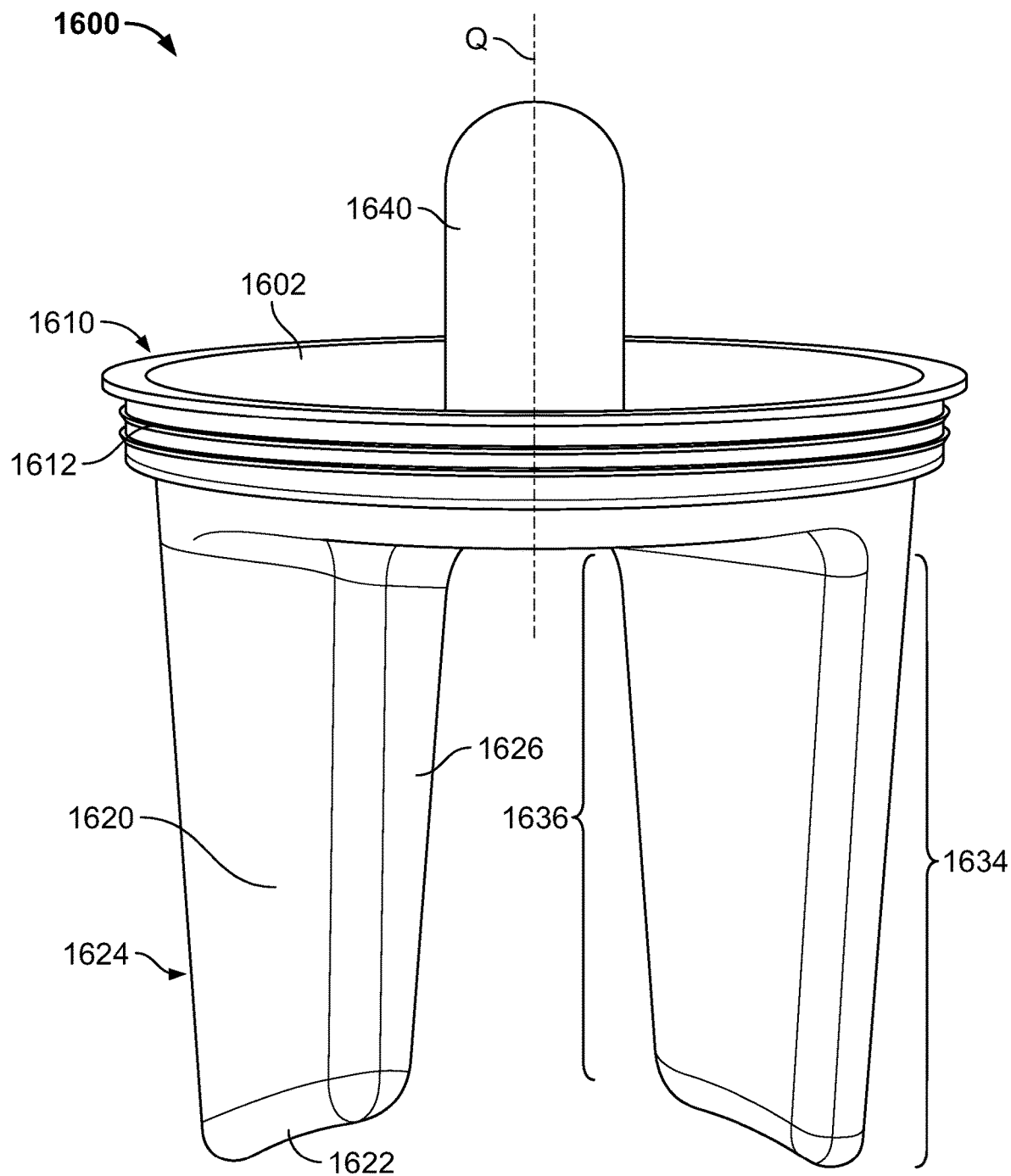
FIG. 23 is a side and front prospective view of another blending volume reduction device including flow impeding members, in accordance with various disclosed aspects.

FIGS. 22 and 23 depict blending volume reducing devices 1500 and 1600, in accordance with various embodiments disclosed herein. The blending volume reducing devices 1500 and 1600 may comprise protrusions or flow impeding members which may extend towards bottom inner surfaced of blending containers. In an aspect, the flow impeding members may comprise various shapes and/or dimensions. It is noted that the blending volume reducing devices 1500 and 1600 may comprise any number of flow impeding members. It is further noted that the flow impeding members may comprise similar aspects and/or functionality as corner shield members described herein. In at least one embodiment, a blending volume reducing device may include corner shield members and flow impeding members.

With reference to FIG. 22, the blending volume reducing device 1500 may include one or more apertures having a plug or lid that may seal the one or more apertures. Furthermore, blending volume reducing device 1500 may comprise a handle, such as shown in FIG. 23 and other described embodiments. Blending volume reducing devices 1500 may include a cover member 1502 that may include a flange member 1510 and a seal member 1512. In another aspect, blending volume reducing device 1500 may include one or more protrusions or arms, such as arms 1520 and 1530, which may impede flow of material and reduce a working volume within a blending container, reduce a working volume, and/or may function as finger holes to allow a user to manipulate the blending volume reducing device 1500. As described herein, blending volume reducing devices 1500 may be configured to be removably inserted in or attached (e.g., removably or irremovably) to a blending container. For instance, a user may place blending volume reducing devices 1500 within a cavity of a blending container. Blending volume reducing devices 1500 may be configured to reduce a working volume of a blending container when inserted in or attached to the blending container. For example, at least a portion of cover member 1502 and/or arms 1520 and 1530 may be disposed within a cavity of a blending container. It is noted that blending volume reducing device 1500 may be utilized with various blending containers (e.g., single serve containers, pitcher-shaped containers, bowl-shaped containers, etc.).

In at least one embodiment, blending volume reducing device 1500 may comprise an axis W, and cover member 1502 may comprise an exterior perimeter 1504 that circumscribes the axis W. In another aspect, the exterior perimeter 1504 that substantially matches an intermediate inner perimeter of a blending container in size and/or dimension. In an example, an internal radial cross-sectional area of a blending container may become smaller along the an axis of the container (e.g., as shown in FIG. 1) from the top to the bottom of the container, when the flow directing device 1500 is positioned into the container (e.g., such that the axis W is generally coaxial with an axis of a container), the cover member 1502 will rest at or match the intermediate inner perimeter of the container and be supported by the side walls of the container. In another aspect, flange 1510 may rest or contact a top lip of container and may prevent blending volume reducing device 1300 from slipping or otherwise moving further in cavity than desired. Seal member 1512 may have an outer perimeter that is larger than intermediate inner perimeter. For instance, seal member 1512 may comprise an at least partially flexible or deformable material. When blending volume reducing device 1500 is positioned into or otherwise attached to the blending container, at least a portion of seal member 1512 may be deformed or otherwise altered such that the cavity is sealed or closed via seal member 1512 and walls of the container 12. It is noted that seal member 1512 and walls of the container 120 may form a seal that is air tight, liquid tight, or the like.

In at least one embodiment, the cover member 1502 may be additionally or alternatively supported by other means such as, for example, hooks that are secured to top edges of the container's side walls, a handle, and/or a cover of a container. In another example, the cover member 1502 may be additionally or alternatively supported by legs that may be supported by a container bottom. According to at least one embodiment, the cover member 1502 may be additionally or alternatively supported by formations of the container, such as a stop or protrusion extending proximal to the intermediate inner perimeter of a container.

Arms 1520 and 1530 may protrude or extend from seal member 1520 towards a container bottom when blending volume reducing device 1500 is attached to or inserted into a container. In embodiments, at least one of arm 1520 or arm 1530 may engage with one or more of flutes or other members of a container. Engaging may include abutting or contacting flutes such that blending volume reducing device 1500, arm 1520, and/or arm 1530 is substantially held in place during a blending process. During the blending process, foodstuff may be forced towards walls of a container from a motion of the blade assembly. In an aspect, foodstuff may form a vortex which may be substantially coaxial with the axis of a container (e.g., axis X of container 12). While a container may comprise features that may force foodstuff towards a blade assembly, a user may desire increased forcing of the foodstuff towards the blade assembly, such as to more efficiently blend a product. Thus, the user may utilize blending volume reducing device 1500. Arms 1520 and 1530 may fold or force foodstuff towards a blade assembly and may collapse the vortex. Forcing foodstuff towards a blade assembly may result in increased amounts of foodstuff contacting blade assembly during a given period, may alter (e.g., reduce) overall blending time, may alter (e.g., reduce) time needed to impart heat in foodstuff, or may otherwise increase efficiencies of a blending process.

Turning to FIG. 23, there is blending volume reducing device 1600. It is noted that liked-named components of blending volume reducing device 1600 and various other embodiments described herein may comprise substantially similar functionality or aspects. For instance, flange 1510 and flange 1610 may comprise substantially similar functionality or aspects.

As depicted, blending volume reducing device 1600 may primarily include cover member 1602 (which may include flange 1610 and seal member 1612), handle 1640, and one or more arms (e.g., arm 1620). Furthermore, blending volume reducing device 1600 may include axis Q. It is noted that blending volume reducing device 1600 may comprise other components not shown for readability, such as an aperture that may facilitate adding ingredients to a blending container or manipulating ingredients within the blending container while blending volume reducing device 1600 is attached to the blending container.

Arm member 1620 may comprise a generally solid material and may extend from cover member 1620 along axis Q to a terminal end 1622 or arm 1620. An exterior portion 1624 of arm 1620 and an interior portion of arm 1626 may taper from cover member 1620 to terminal end 1622. For instance, a cross-section (e.g., cut perpendicularly from axis Q) of arm 1620 may reduce in perimeter size from cover member 1620 along axis Q to the terminal end 1622. In another aspect, a perimeter of a cross-section of arm 1620 may be generally triangular, generally elliptical, or may generally represent various other shapes.

In at least one embodiment, exterior portion 1624 may interlock or otherwise abut one or more flutes of a blending container when blending volume reducing device 1600 is attached to the blending container. For example, a user may attach blending volume reducing device 1600 to container 12. The user may align blending volume reducing device 1600 and container 12 such that axis Q and axis X are generally coaxial. The user may also align arm 1620 to contact at least one flute. Thus, when blade assembly 160 rotates or otherwise blends foodstuff, arm 1620 may be substantially prevented from moving or being displaced. In such embodiments, arm 1620 may be substantially perpendicular to flutes of a container.

In various other embodiments, arm 1620 may be secured or substantially held in place by one or more other means. For instance, arm 1620 may comprise a groove or other feature that may receive at least a portion of a flute. In other examples, arm 1620 may be secured via hooks, clips, magnets, threaded members, or the like.

In embodiments, terminal end 1622 may be configured to avoid or otherwise not contact blades of a blade assembly (e.g., blade assembly 16). In various embodiments, terminal end 1622 may comprise a cut-out configuration where a portion of terminal end 1622 is substantially removed or void of material. For example, inner portion 1626 may have a first length 1636 from cover member 1602 to terminal end 1622, and exterior portion 1624 may have a second length 1634 from cover member 1602 to terminal end 1622. The first length 1636 may be smaller than the second length 1634. In another aspect, terminal end 1622 may be relatively straight or curved (e.g., concave, convex, etc.). In some embodiments, arm 1626 may be configured such that terminal end 1622 avoids the highest vertical point of blade assembly. It is also noted that terminal end 1622 may rest or be pressed against a feature of a container.

It should be understood that the blending volume reduction device may take any appropriate configuration. Those shown herein are merely exemplary. The blending volume reduction device is useful in reducing the working volume of the container so that as the blending device blends in the reduced working volume, the blending operation is more efficient and effective.

It will be apparent to those skilled in the art that various modifications and variations can be made to the present disclosure without departing from the spirit and scope of this disclosure. Thus, it is intended that the present disclosure cover the modifications and variations of this disclosure provided they come within the scope of the appended claims and their equivalents.

What is claimed is:

1. A blending volume reduction device for use with a blending container, the blending volume reduction device comprising:
   a cover member comprising a main body;
   a handle extending from the main body, the handle comprising a U-shaped body, and wherein the handle comprises a pair of adjustable arms extending from the U-shaped body;
   at least one side wall extending generally perpendicular from a perimeter of the main body; and
   a seal member extending from the at least one side wall, wherein the seal member operatively forms a seal with the blending container when the seal member is positioned in the blending container and whereby the cover member and a bottom of the blending container form an enclosed cavity.

2. The blending volume reduction device of claim 1 further comprising an actuator, the actuator selectively locks the handle in an operative position relative to the blending container.

3. The blending volume reduction device of claim 1, wherein the handle comprises a grip portion.

4. The blending volume reduction device of claim 1, wherein the seal member is configured to form the seal a distance from an open end of the blending container to reduce a working volume of the blending container.

5. The blending volume reduction device of claim 4, wherein the working volume of the blending container is reduced 90%.

6. The blending volume reduction device of claim 4, wherein the working volume of the blending container is reduced 75%.

7. The blending volume reduction device of claim 4, wherein the working volume of the blending container is reduced 50%.

8. The blending volume reduction device of claim 1, wherein the seal member comprises a perimeter configured to engage with an intermediate inner perimeter of the blending container to reduce a time of a blending process.

9. The blending volume reduction device of claim 1, wherein the blending volume reduction device is positionable within the blending container to increase a heat rise of blended ingredients by 100%.

10. A blending volume reduction device for use with a blending container, the blending volume reduction device comprising:
   a cover member comprising a main body and an aperture;
   a U-shaped handle extending from the main body, the handle being rotatable relative to the cover member to expose the aperture, wherein the handle comprises a pair of arms extending from the handle, wherein the arms are insertable into and out of the handle;
   at least one side wall extending generally perpendicular from a perimeter of the main body; and
   a seal member extending from the at least one side wall, wherein the seal member operatively forms a seal with the blending container when the seal member is positioned in the blending container holding the seal member at an operative position relative to the blending container and whereby the cover member and a bottom of the blending container form an enclosed cavity.

11. The blending volume reduction device of claim 10, wherein the arms are friction fit with the handle.

12. The blending volume reduction device of claim 10 further comprising a gripping portion positioned on an upper portion of the handle.

13. The blending volume reduction device of claim 12, wherein the gripping portion is pressable to lock or unlock the handle with respect to the arms.

14. The blending volume reduction device of claim 10, wherein the handle comprises at least one stop that is engageable with the blending container.

15. The blending volume reduction device of claim 14, wherein the at least one stop comprises a tab or protrusion extending from the handle.

16. The blending volume reduction device of claim 10, wherein the seal member is configured to form the seal a distance from an open end of the blending container to reduce a working volume of the blending container.

17. The blending volume reduction device of claim 16, wherein the working volume of the blending container is reduced 90% or 75%.

* * * * *